(12) United States Patent
Gordon et al.

(10) Patent No.: US 8,555,818 B2
(45) Date of Patent: Oct. 15, 2013

(54) FELINE EXUDATE APPARATUS AND METHOD

(75) Inventors: Tal Gordon, Hod HaSharon (IL); Erel Benjamini, Kfar Sava (IL); Shalom Levin, Atlit (IL)

(73) Assignee: Pet Novations Ltd., Kfar Bazra (IL)

( * ) Notice: Subject to any disclaimer, the term of this patent is extended or adjusted under 35 U.S.C. 154(b) by 1108 days.

(21) Appl. No.: 11/930,837

(22) Filed: Oct. 31, 2007

(65) Prior Publication Data
US 2008/0047499 A1 Feb. 28, 2008

Related U.S. Application Data

(63) Continuation of application No. 11/293,178, filed on Dec. 5, 2005.

(51) Int. Cl.
*A01K 29/00* (2006.01)
(52) U.S. Cl.
USPC .......................................................... 119/166

(58) Field of Classification Search
USPC .................. 119/165, 166, 161, 162, 163, 168
See application file for complete search history.

(56) References Cited

U.S. PATENT DOCUMENTS

| | | | | |
|---|---|---|---|---|
| 4,117,555 A | * | 10/1978 | Dennis | 119/163 |
| 6,079,364 A | * | 6/2000 | Tamba | 119/163 |
| 6,202,595 B1 | * | 3/2001 | Atcravi | 119/165 |
| 6,568,348 B1 | * | 5/2003 | Bedard | 119/166 |

FOREIGN PATENT DOCUMENTS

| JP | 1998117618 | 5/1998 |
|---|---|---|
| RU | 2377768 | 7/2009 |

* cited by examiner

*Primary Examiner* — Son T Nguyen
(74) *Attorney, Agent, or Firm* — Dekel Patent Ltd.; David Klein

(57) ABSTRACT

A method including removing feline exudates from litter, washing and drying the litter, wherein the litter is agitated during drying thereof. Feline exudate apparatus is also described that includes a vessel for containing therein litter, apparatus for washing the litter; and apparatus for drying the litter, wherein the litter is agitated during drying thereof.

11 Claims, 26 Drawing Sheets

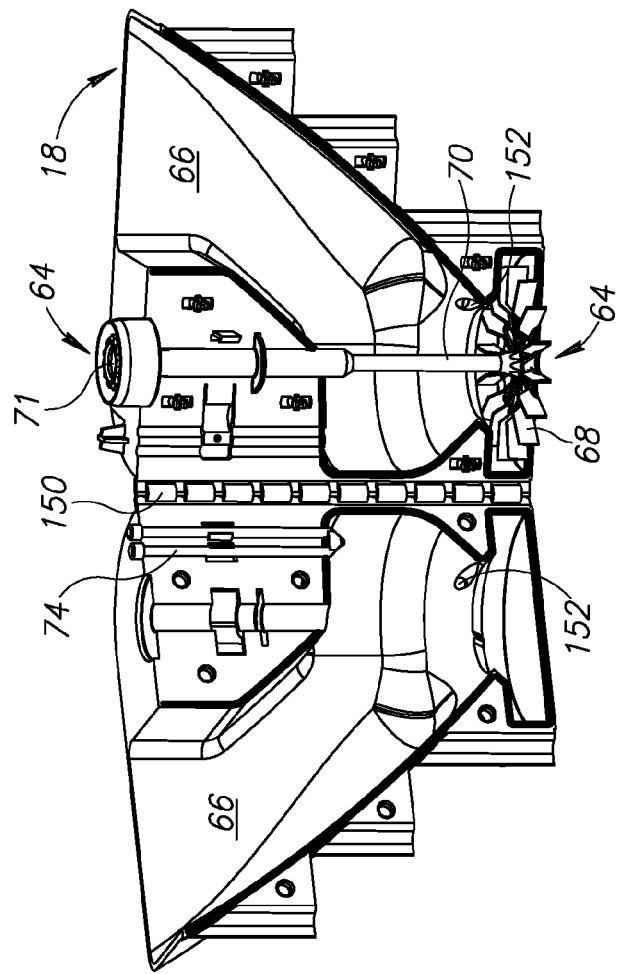
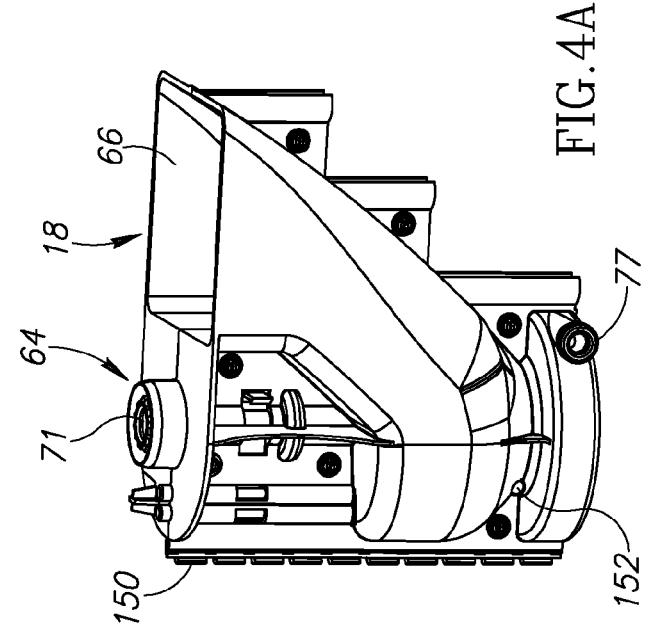
FIG. 4B
FIG. 4A

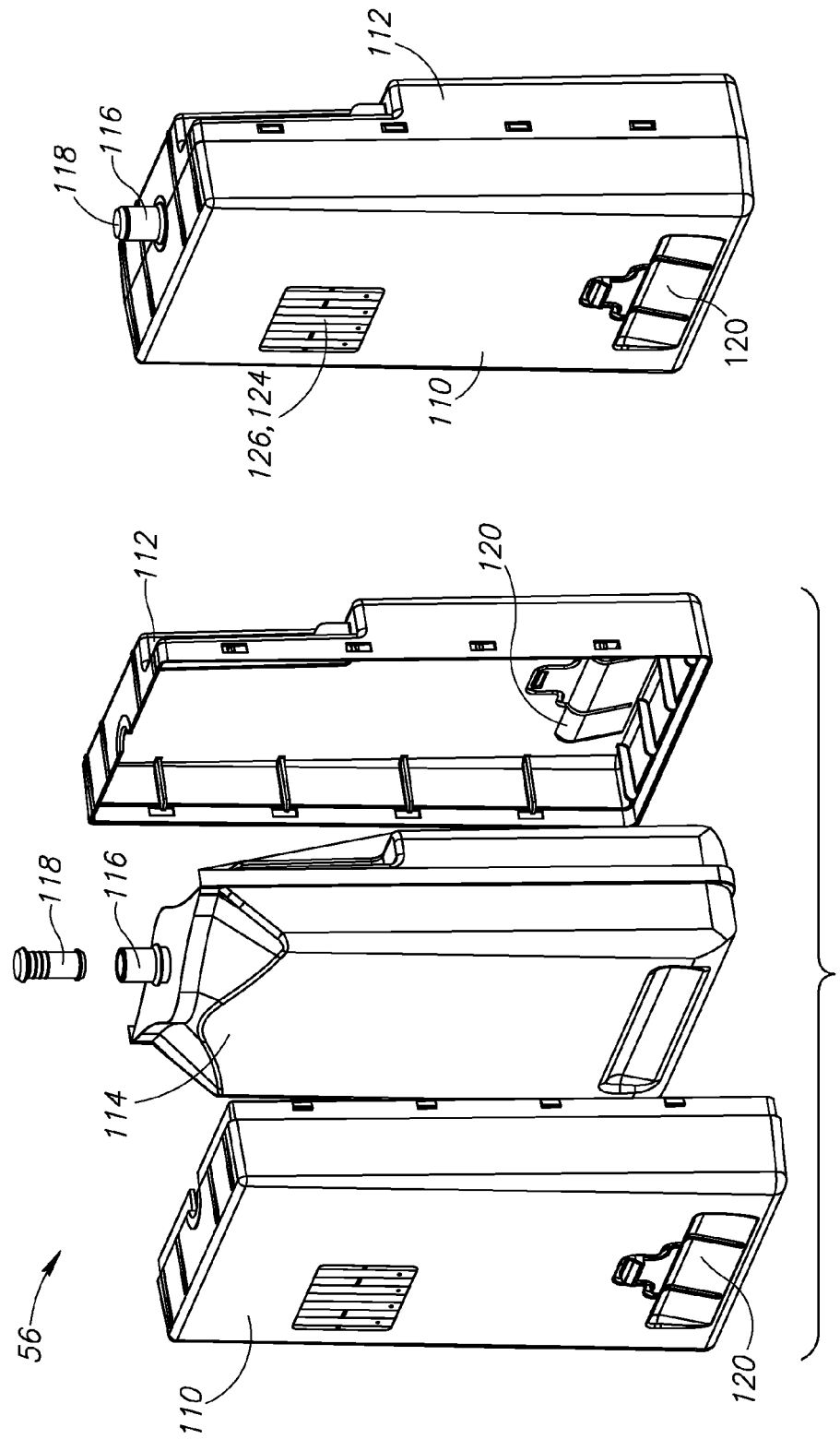

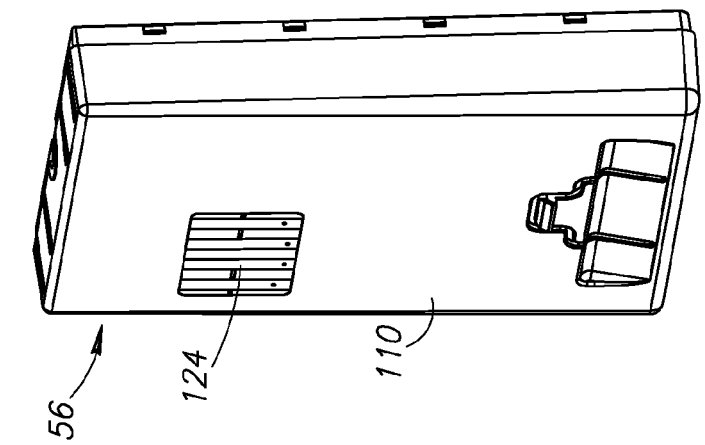
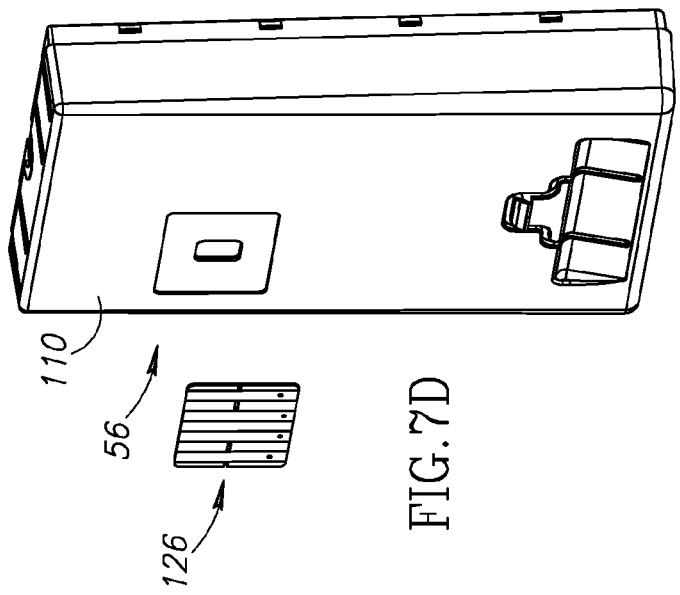
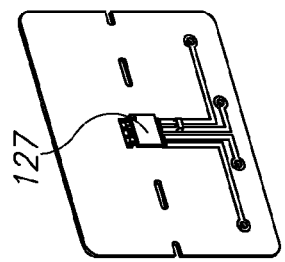
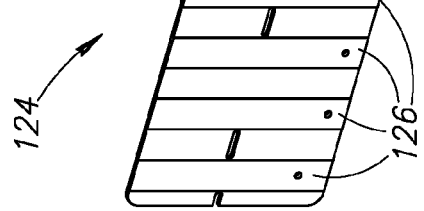

FELINE EXUDATE APPARATUS AND METHOD

CROSS-REFERENCE TO RELATED APPLICATIONS

This application is a continuation of U.S. patent application Ser. No. 11/293,178, filed Dec. 5, 2005.

FIELD OF THE INVENTION

The present invention relates generally to litter boxes, and particularly to apparatus for removal of feline exudates from litter found in litter boxes.

BACKGROUND OF THE INVENTION

There are many devices for automatically dealing with disposal of feline exudates. Some devices separate the exudates from litter and some wash the litter.

SUMMARY OF THE INVENTION

The present invention seeks to provide improved feline exudate apparatus, as described more in detail hereinbelow.

There is provided in accordance with an embodiment of the present invention a method including removing feline exudates from litter, washing and drying the litter. In one embodiment, the litter may be washed only after removing the feline exudates from the litter. The litter may be overturned during drying thereof.

In accordance with an embodiment of the present invention, the litter is disposed in a vessel, and the vessel is moved during washing and/or drying of the litter. The underside and/or sides of the vessel may be exposed during drying of the litter.

Further in accordance with an embodiment of the present invention removing the feline exudates from the litter includes introducing a scoop into the litter that scoops out the feline exudates from the litter. The scoop may overturn the litter as the vessel moves. The scoop may have apertures for the litter to pass through, and the method may further include moving the litter through the apertures as the vessel moves. The scoop may vibrate during separation (scooping the exudates into the scoop), washing and/or drying. The vibration may help granules to pass through the apertures of the scoop, while the exudates are trapped in the scoop during separation. The vibration during washing and during drying may improve passage of the granules through the apertures and thereby enhance a trommel effect during washing and enhance a mixing effect that accelerates drying, as described hereinbelow. The underside and/or sides of the vessel may be scraped by the scoop during washing and/or drying of the litter.

Washing the litter may include soaking the litter and feline exudates in a washing liquid while the vessel is moving. While soaking the litter and feline exudates in the washing liquid while the vessel is moving, the litter and exudates may rub against the scoop. The scoop may be moved to different positions in the vessel while the vessel is moving. The direction of movement of the vessel may be changed at any time.

There is also provided in accordance with an embodiment of the invention apparatus including a vessel for containing therein litter, apparatus for washing the litter; and apparatus for drying the litter, wherein the litter is agitated during drying thereof.

BRIEF DESCRIPTION OF THE DRAWINGS

The present invention will be understood and appreciated more fully from the following detailed description taken in conjunction with the drawings in which:

FIGS. 4A and 4B are simplified closed and open pictorial illustrations, respectively, of the grinding and flushing sub-unit, constructed and operative in accordance with an embodiment of the present invention;

FIGS. 5A-5G show a mode of operation of the feline exudate apparatus, in accordance with an embodiment of the present invention, wherein FIG. 5A is a simplified pictorial illustration of the scoop having been lowered into the vessel from the stowed position of FIG. 1;

FIG. 5B is a simplified pictorial illustration of the scoop moved upwards out of the litter, with exudates caught thereon, wherein the scoop may be shaken to loosen litter particles therefrom;

FIG. 5C is a simplified side view illustration of the scoop raised to the stowed position, with exudates dropping from the scoop into the chute (and may drop into water introduced into the chute);

FIGS. 5D and 5E are simplified pictorial and side-view illustrations, respectively, of washing and scrubbing the litter and vessel, with the scoop having been lowered again into the vessel;

FIG. 5F is a simplified pictorial illustration of the flushing and grinding unit with exudates getting sliced by a stepped blade, with the outer part of the blade acting as a centrifugal pump, in accordance with an embodiment of the present invention;

FIG. 5G is a simplified pictorial illustration of drying the litter and vessel, in accordance with an embodiment of the present invention;

FIGS. 6A-6G are simplified pictorial illustrations of operation of the scoop mechanism, wherein FIGS. 6A-6E illustrate the scoop being gradually moved into the vessel, and FIGS. 6F-6G illustrate the scoop being returned to its stowed position;

FIGS. 7A-7G are simplified illustrations of a dispenser used to store and dispense detergent or disinfection solution, odor neutralizer, deodorant or other suitable chemicals or any combination thereof, in accordance with an embodiment of the present invention, wherein FIGS. 7A and 7B are exploded and pictorial illustrations, respectively, of a flexible container mounted in housing halves, FIG. 7C is a simplified illustration of a PCB used in the dispenser (showing both sides of the PCB), FIGS. 7D and 7E are exploded and pictorial illustrations, respectively, of the dispenser assembled with the PCB, and FIGS. 7F and 7G are simplified illustrations, respectively, of the dispenser partially and fully inserted in a dispenser housing.

DETAILED DESCRIPTION OF EMBODIMENTS

General Overall Description of Sub-Assemblies

Reference is now made to FIGS. 1-4, which illustrate feline exudate apparatus 10, constructed and operative in accordance with an embodiment of the present invention.

Figure 1:
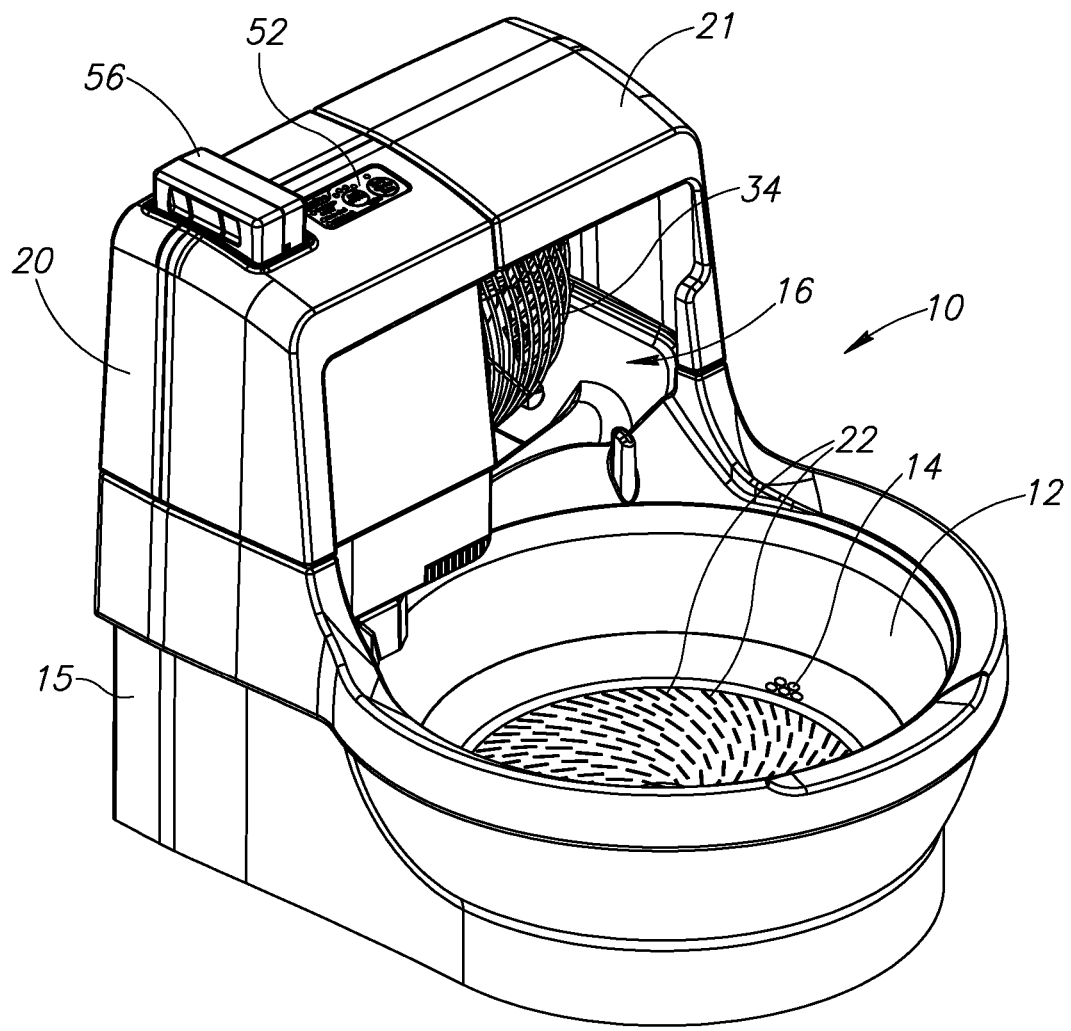
FIG. 1 is a simplified pictorial illustration of feline exudate apparatus, constructed in accordance with an embodiment of the present invention and operative to carry out methods of the invention as described herein.

Referring right now to FIG. 1, feline exudate apparatus 10 may include a vessel (or bowl) 12, in which cat litter 14 is placed (for simplicity, only a few pieces of litter 14 are shown). Litter 14 may include any kind of litter suitable for cats, such as but not limited to, clumping litter, silica-based litter and clay litter, or washable granules (e.g., plastic granules) or any combination thereof. Clay litter absorbs liquid exudates and odors. Clumping litter forms pieces or clumps after contacting moisture in feline exudates. The clumps can then be removed and discarded, leaving the rest of the litter undisturbed.

Silica-based litter or granules absorb odors and liquid waste. Solid waste must be removed. The litter may be biodegradable and thus decomposes. Silica-based litter and clay litter do not have clumping action. All of the litter types may or may not be scented.

A separator 16 may be provided for separating and removing feline exudates from the litter 14. Separator 16 may be constructed as a scoop, as is described more in detail hereinbelow. A flushing device 18 (FIGS. 1B and 3) may receive the feline exudates from the separator 16 and flush the feline exudates to a waste system (not shown). It is not necessary to reduce the size of the feline exudates prior to flushing, that is, there is no need to grind, crush, disintegrate, dissolve or otherwise mechanically, biologically or chemically reduce the size of the feline exudates particles. However, alternatively, such size reduction may be included as part of the present invention, as is described further hereinbelow. Size reduction may help in disposing the waste through a sewer or other waste system.

Figure 1B:
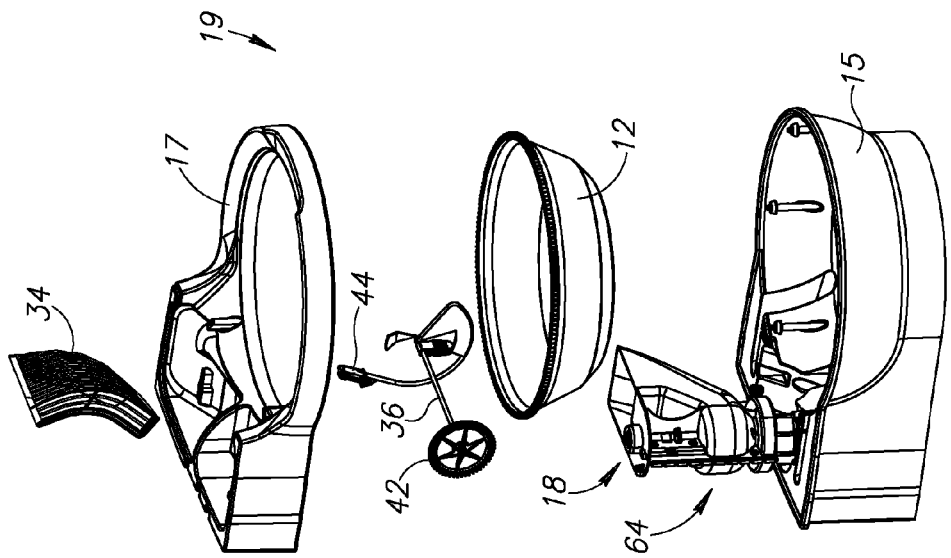
FIG. 1B is a simplified exploded illustration of the bowl and scoop portion of FIG. 1A.
Figure 1A:
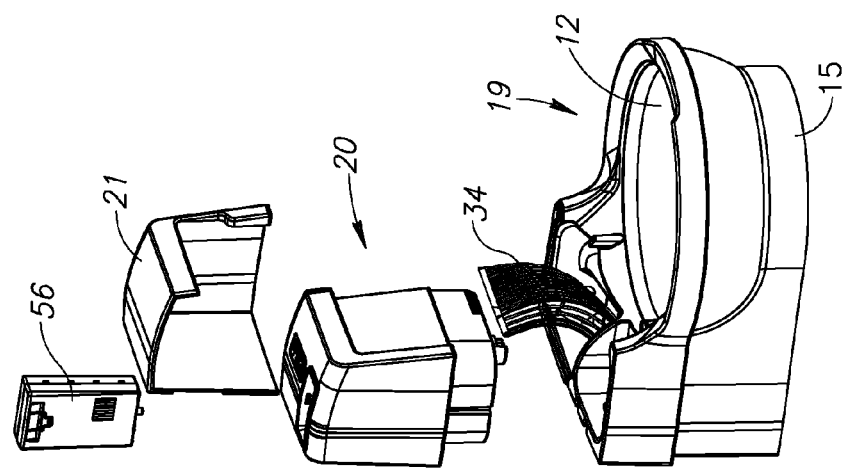
FIG. 1A is a simplified exploded illustration of the feline exudate apparatus of FIG. 1, showing the bowl (i.e., vessel) and scoop portion, processing unit, scoop cover and dispenser.

Reference is now made to FIGS. 1A and 1B. The feline exudate apparatus 10 may have a user-friendly construction of sub-assemblies that can be easily dismantled for cleaning or maintenance, and which can be easily re-assembled. As seen in FIG. 1A, feline exudate apparatus 10 may be constructed of a vessel housing and scoop portion 19, a processing unit 20, a scoop cover 21 and a dispenser 56. A hood (not shown) may be optionally provided to at least partially cover vessel 12 and housing 15 so as to prevent a cat from scattering litter outside the apparatus.

The vessel housing and scoop portion 19 may include, as seen in FIG. 1B, the vessel 12, which is mounted for rotation in a housing 15. A vessel cover 17 may fit over the upper rim of vessel 12 and attach to housing 15 (e.g., by snap fit).

The vessel housing and scoop portion 19 may further include a scoop 34 mounted on an arm 36 connected to a drive gear 42, as is described more in detail hereinbelow. The scoop cover 21 covers scoop 34 in its stowed position. Scoop cover 21 may include a cover door for concealing scoop 34 in the stowed position, wherein the cover door opens to allow the scoop 34 to move into vessel 12. All the abovementioned parts of vessel housing and scoop portion 19 may be constructed of an injection molded plastic, for example. The flushing device 18 and an exudate processor 64 may be mounted in vessel housing and scoop portion 19, and is described more in detail hereinbelow with reference to FIGS. 3, 4, 4A and 4B.

The processing unit 20 may include motors or actuators and controllers or processors for moving and controlling operation of the scoop 34, flushing device 18 and other parts of feline exudates apparatus 10, as is described more in detail hereinbelow.

As described below, dispenser 56 may dispense a substance, such as but not limited to, detergent or disinfection solution, odor neutralizer, deodorant, solvents, enzymes, inorganic or organic substances that break down hair or exudates or other suitable chemicals or any combination thereof, into vessel 12, housing 15 or flushing unit 18 for disinfecting litter 14 and vessel 12 or other parts of the apparatus. The dispensed substance may be in the form of a liquid, solid or gas or any combination thereof, such as but not limited to, droplets, powder, pellets, gas spray, liquid spray, aerosol and others.

The sub-assemblies of feline exudate apparatus 10 may be positioned and shaped with respect to each other to give the appearance of a toilet tank and toilet bowl juxtaposed to one another, wherein the processing unit 20 and scoop cover 21 correspond to the toilet tank and vessel housing and scoop portion 19 corresponds to the toilet bowl. Vessel 12 may be generally round. The term "generally round" is meant to include both elliptical and circular shapes. The combination of processing unit 20 and scoop cover 21 may be generally prismatic. The term "prismatic" is meant to include three-dimensional, rectangular, cubic or polyhedron shapes of any proportion, with sharp or rounded corners.

A Non-Limiting Construction of the Vessel

Figure 4:
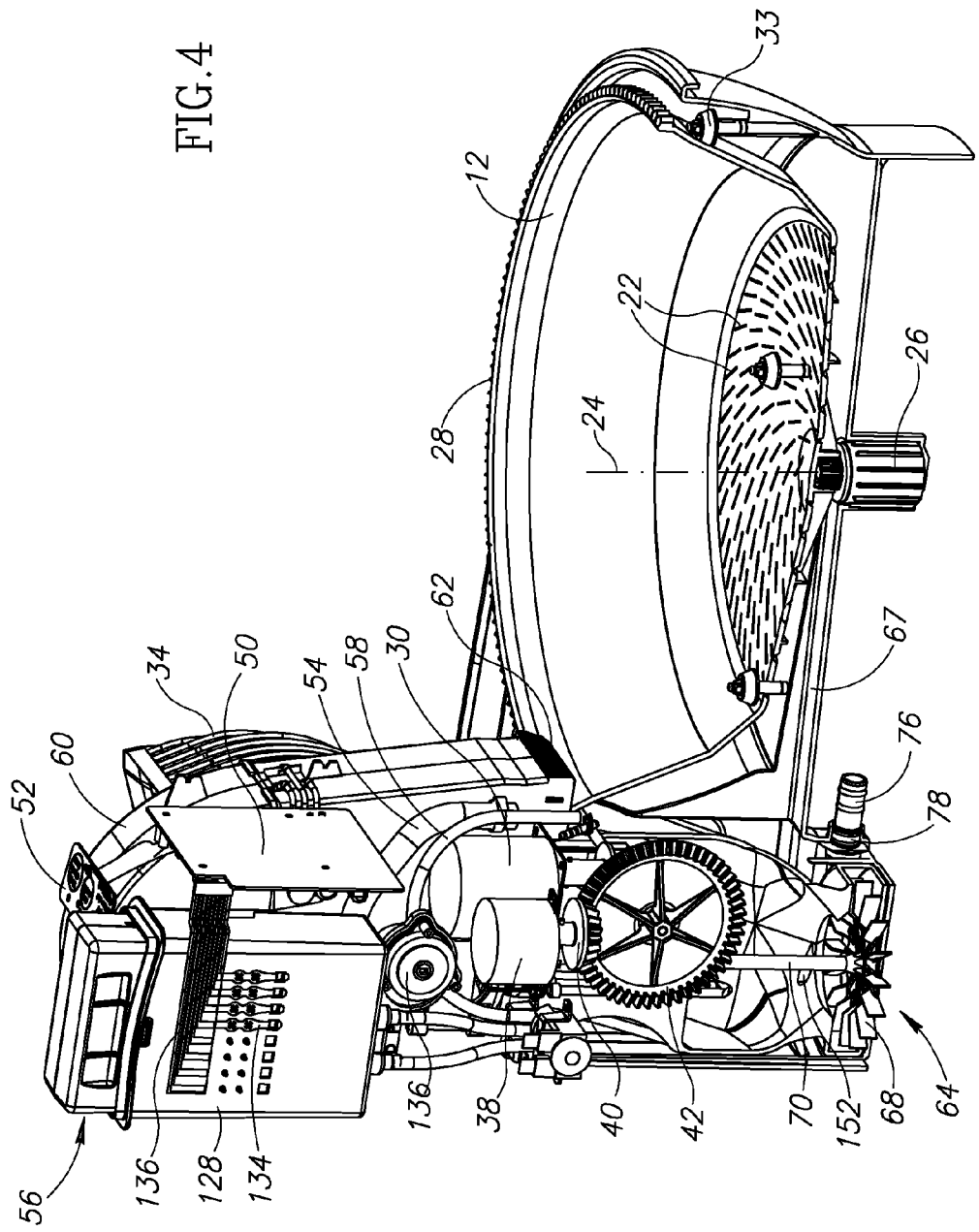

Reference is now made again to FIG. 1. Vessel 12 may be formed with a series of slots 22, such as but not limited to, concentric rows of arcuate slots. Vessel 12 may be mounted for rotation about a rotation axis 24, such as being mounted on a bearing spindle 26 (FIG. 4). A motor 30 may be operatively connected to vessel 12 to cause rotation thereof, the motor 30 being inside processing unit 20 and operatively connected to vessel 12, such as by means of a timing belt or gear train connected to a spindle about which the vessel 12 rotates. For example, in the non-limiting illustrated embodiment, as seen best in FIG. 2, motor 30 rotates a spur gear 32, which meshes with gear teeth 28 formed on the upper periphery of vessel 12. Journal supports 33 (FIG. 4) may be provided to rotatingly support vessel 12.

A Non-Limiting Construction of the Separator

Figure 6A:
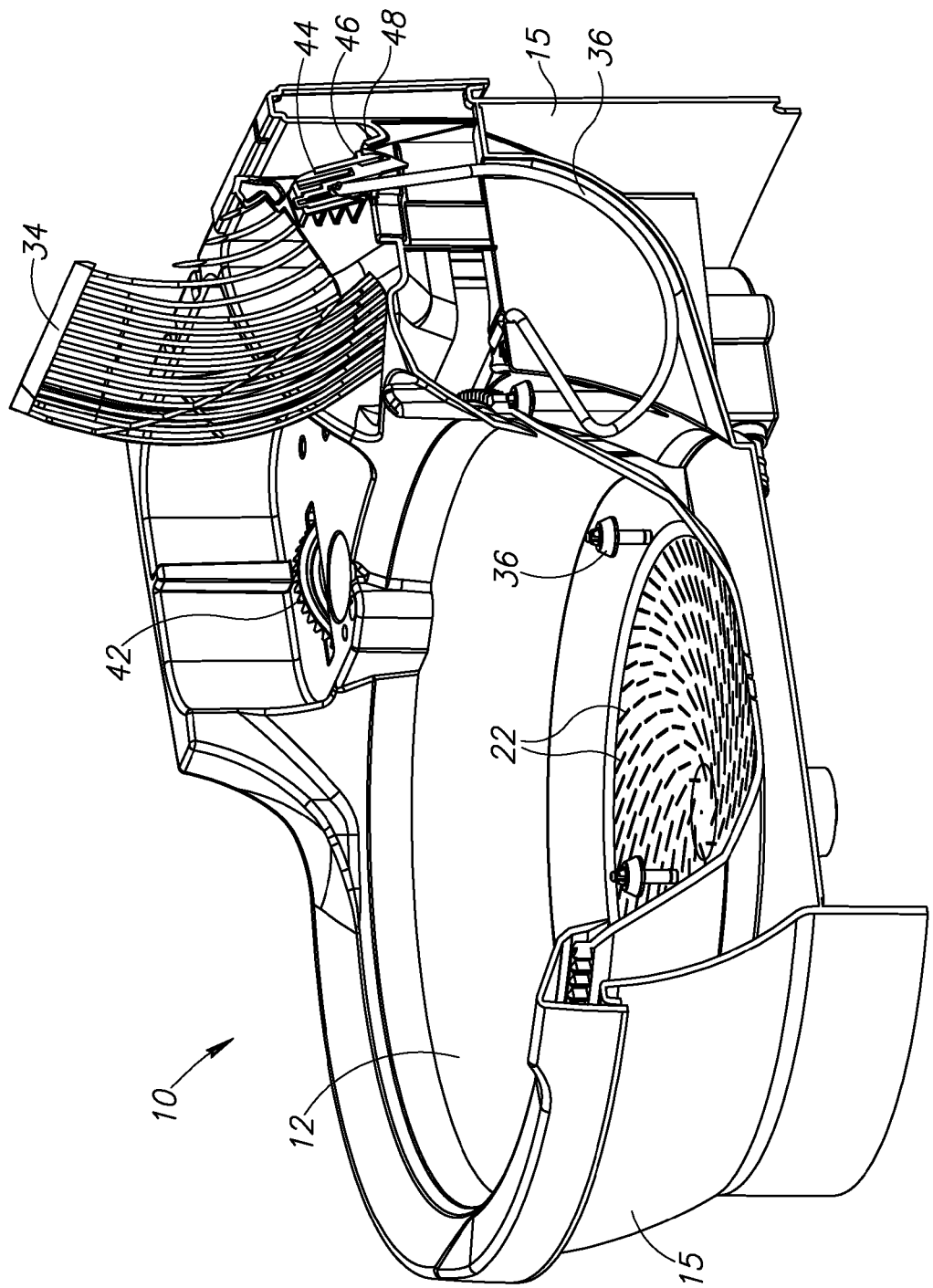
Figure 6B:
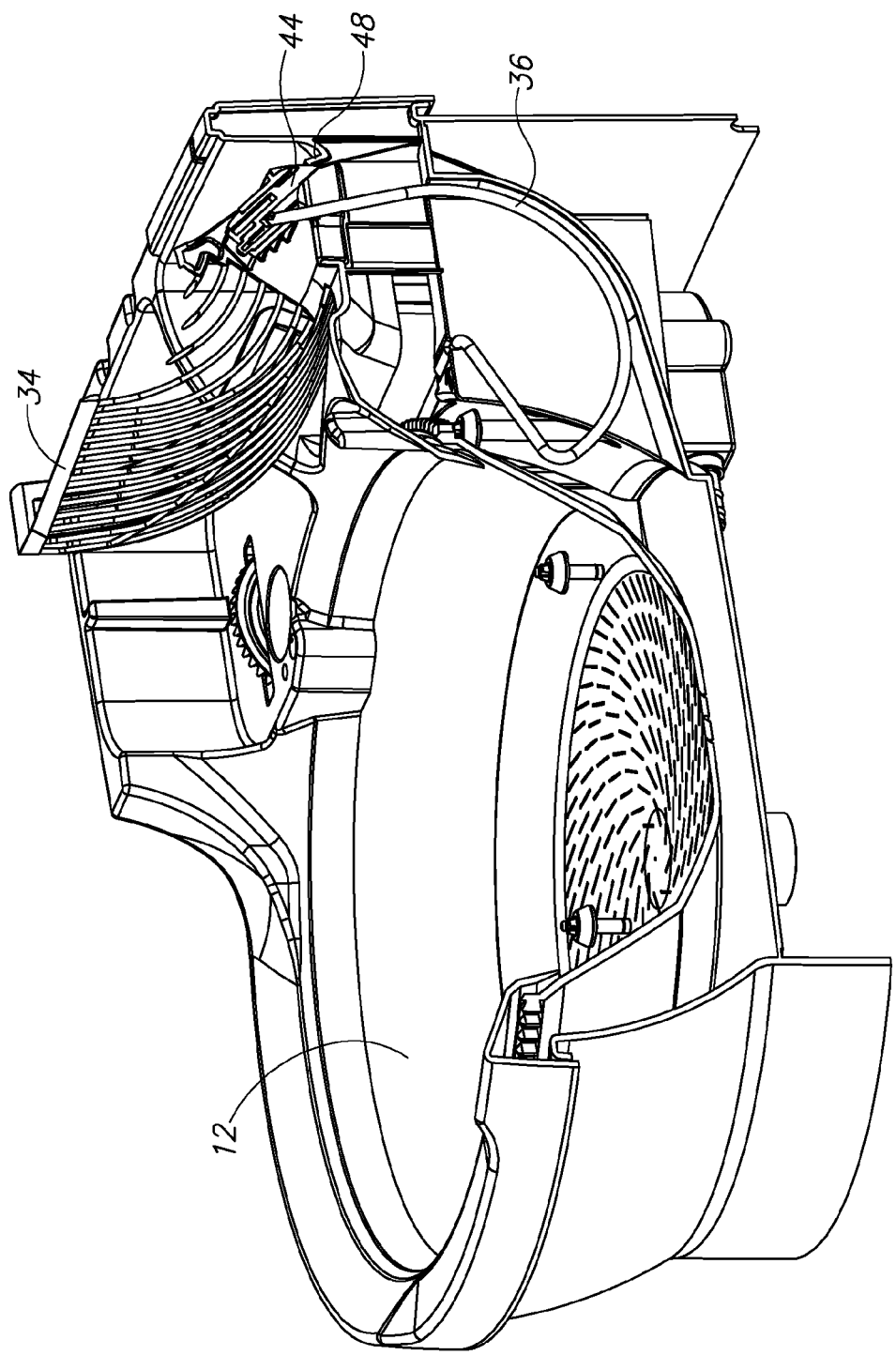
Figure 6C:
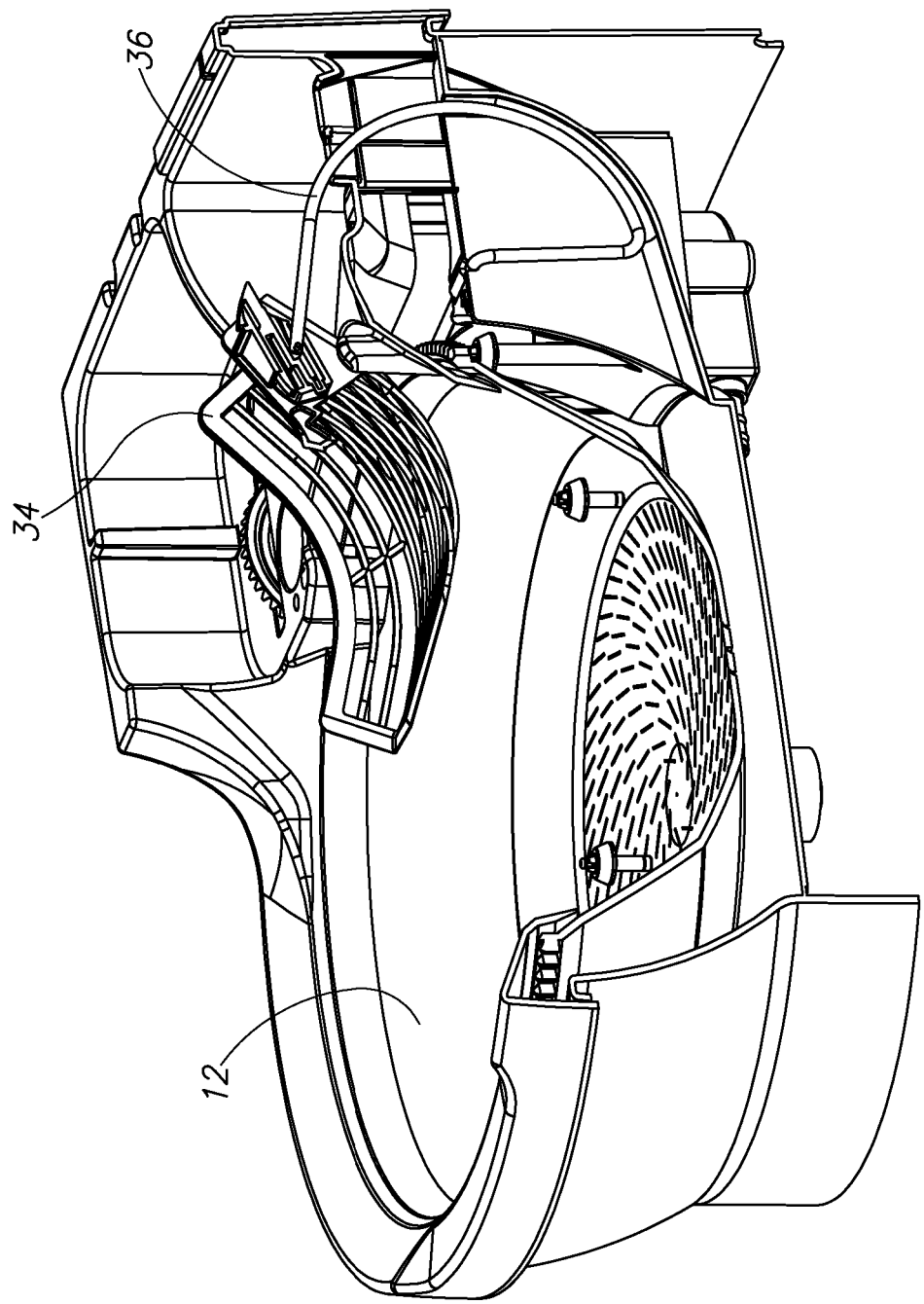
Figure 6D:
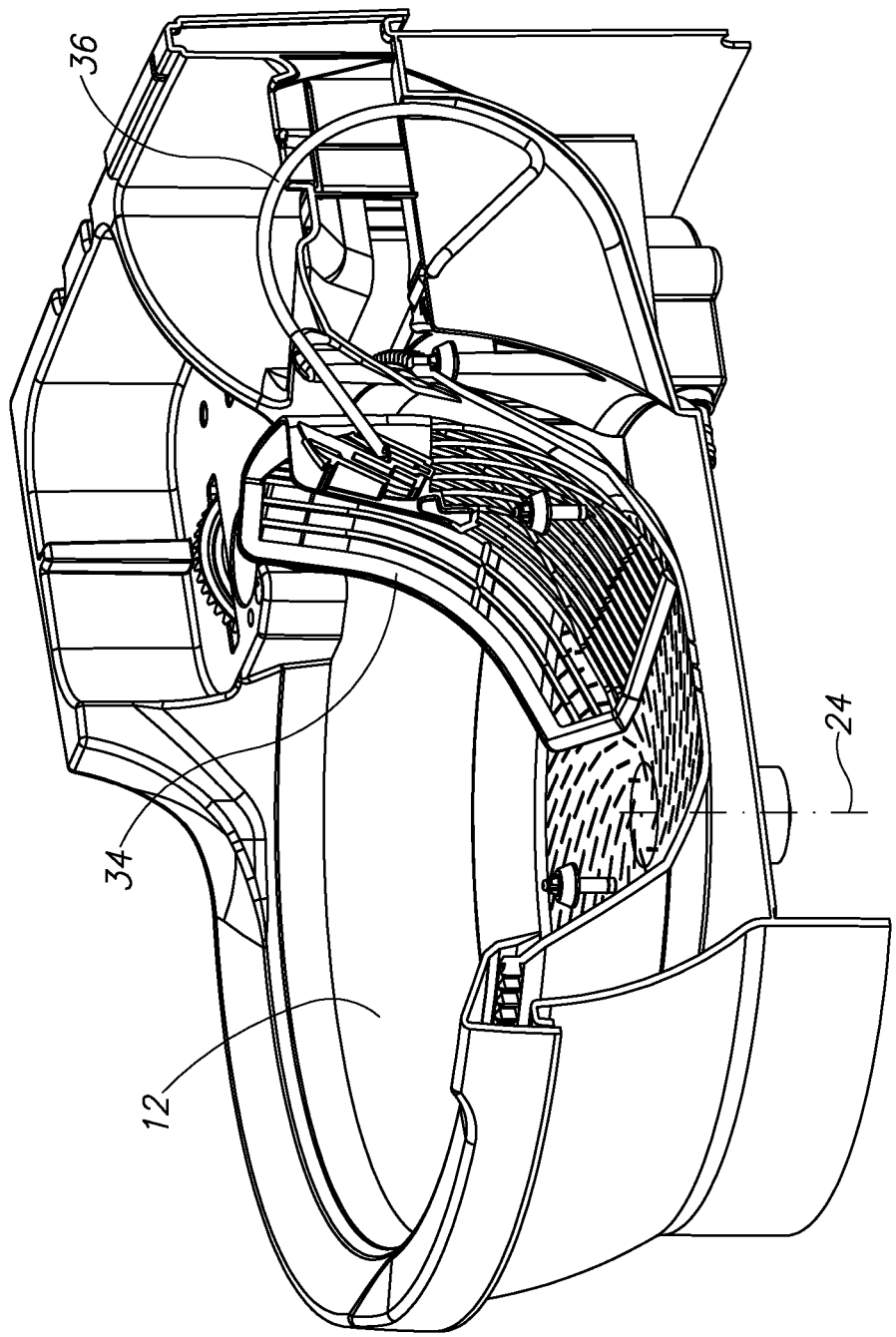
Figure 6E:
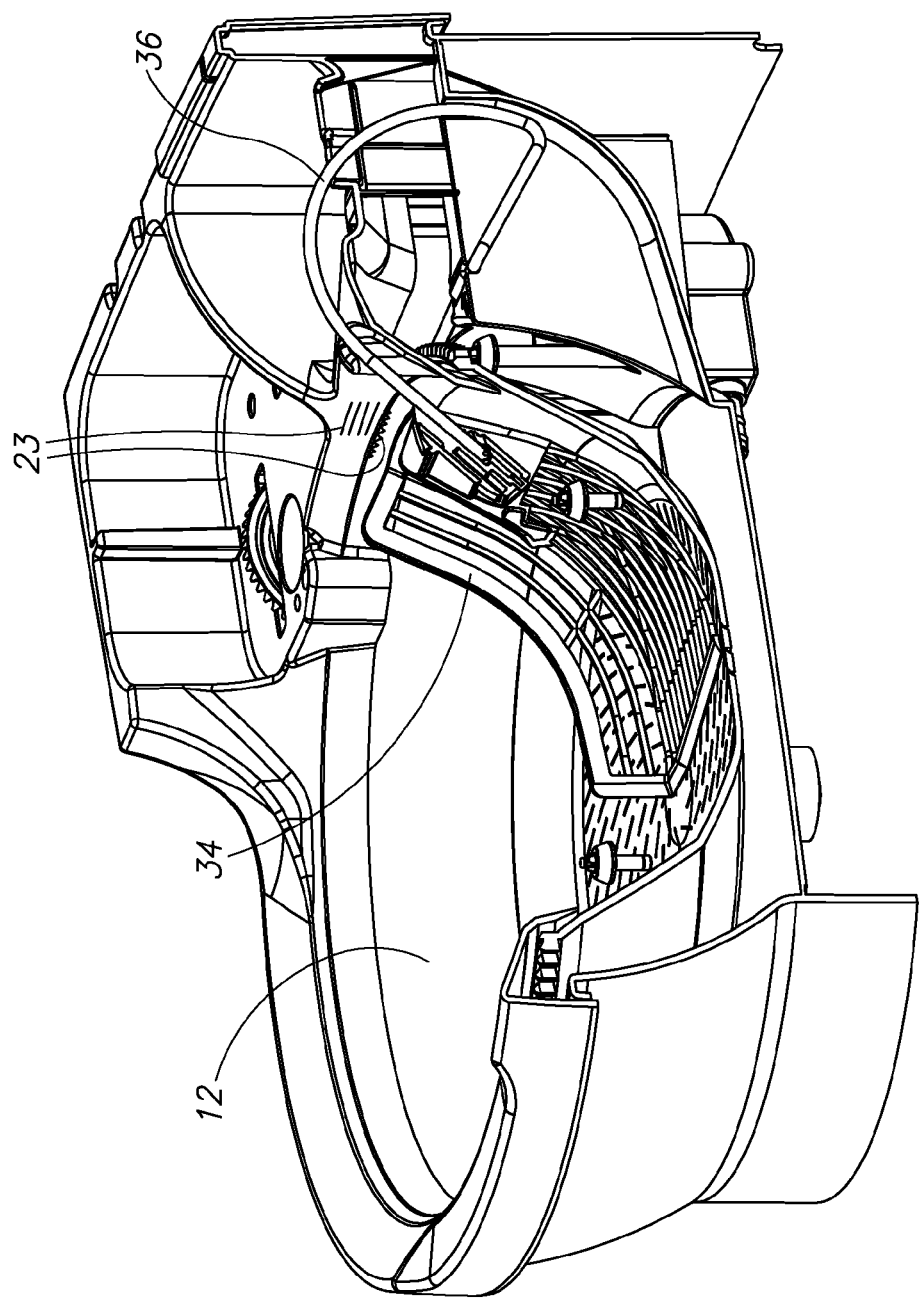
Figure 6F:
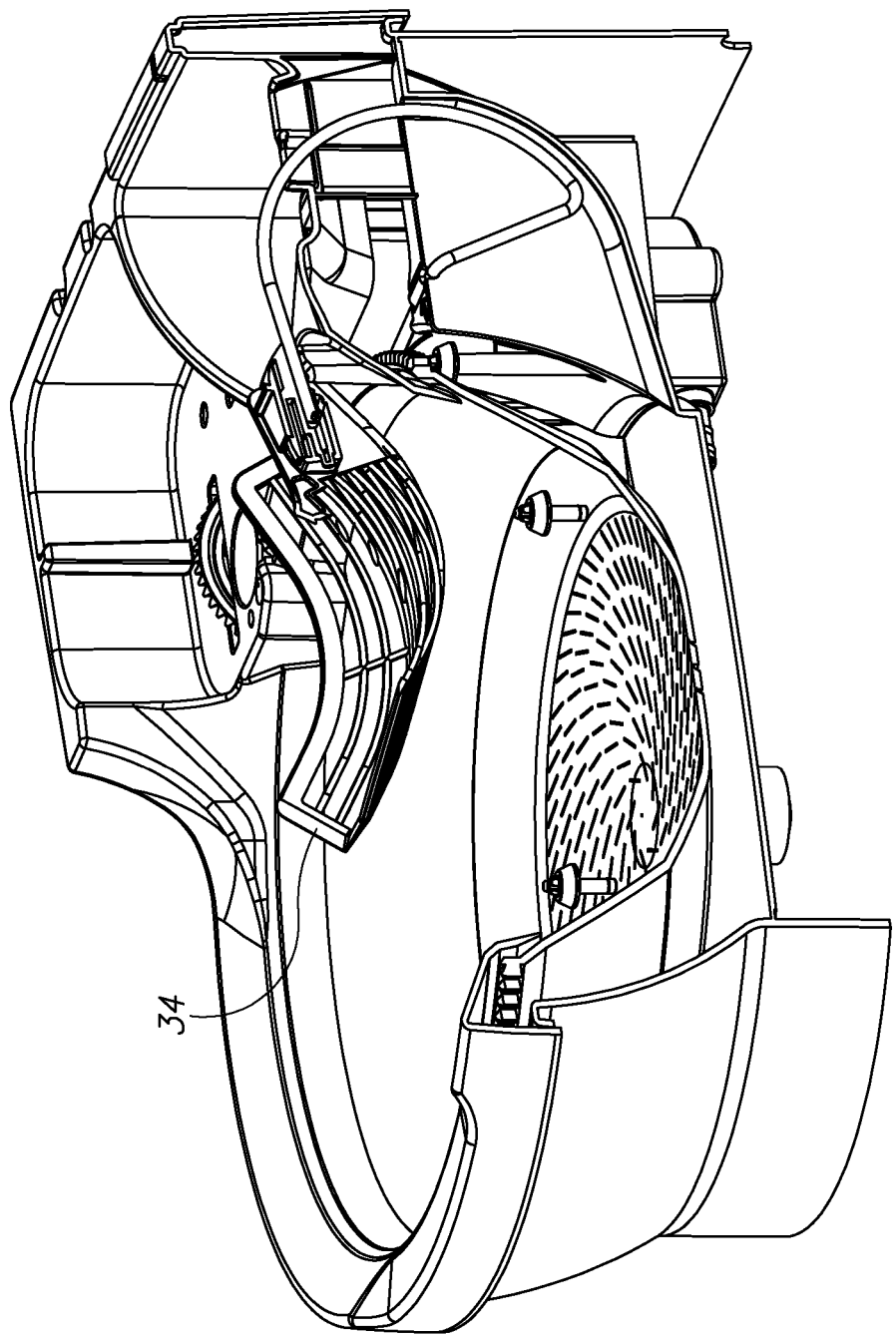
Figure 6G:
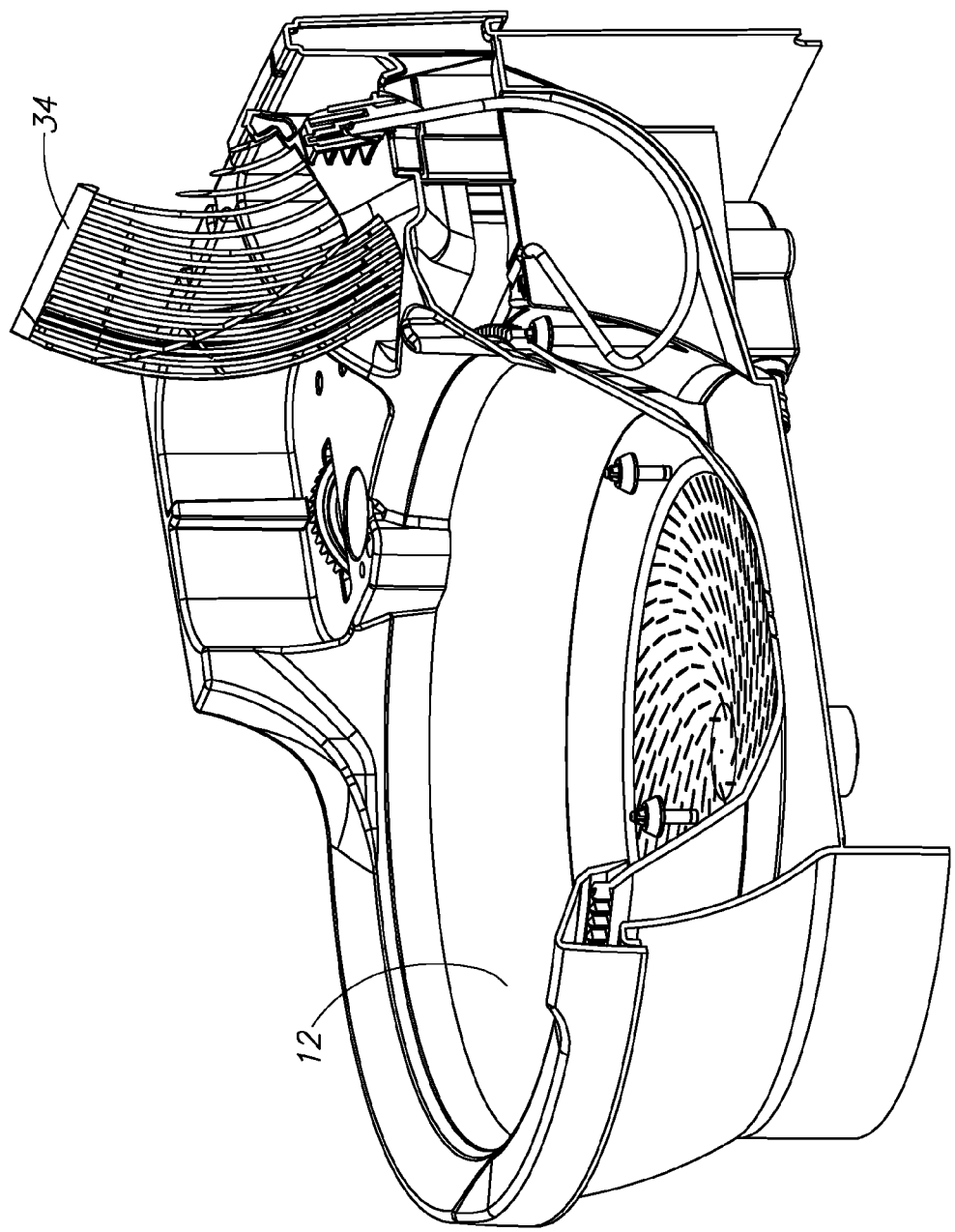

Separator 16 is now described more in detail with respect to FIGS. 1-4. Separator 16 may include a scoop mechanism. The terms "scoop" and "separator" are used interchangeably throughout the specification and the claims, and the terms encompass any device for separating exudates from the litter. The separator mechanism may include, without limitation, a scoop 34 mounted on an arm 36, operatively connected to an actuator 38, such as without limitation, a step motor or gear motor (or motor 30, serving as a multipurpose motor). For example, in the non-limiting illustrated embodiment, as seen best in FIGS. 3 and 4 (also in FIG. 6A), actuator or motor 38 ("actuator" and "motor" are used interchangeably throughout) rotates a spur gear 40, which meshes at 90° with a drive gear 42 connected at its hub to arm 36. Arm 36 may have a straight rod-like portion that connects to the hub of drive gear 42. Arm 36 may then bend in an arcuate manner and eventually pivotally connect to a scoop holder 44 (FIG. 1B). Scoop holder 44 may be pivotally connected to arm 36. The pivoted connection may have several advantages. For example, when scoop 34 is moved down to vessel 12, initially the front edge of scoop 34 touches vessel 12 but not at the center of the vessel (FIG. 6D). The downward motion of the front edge of scoop 34 may cut exudates. Owing to the pivoted connection, the scoop 34 pivots as the front edge of scoop 34 continues to move horizontally along the vessel bottom, with the result that the scoop 34 is thrust horizontally towards the center of vessel 12 (FIG. 6E). Scoop 34 may click into a locked position at this point, that is, it does not pivot with respect to arm 36 (such as by means of a detent). The scoop 34 is thus gradually moved towards the center of vessel 12, and may move thereby any exudates from any singularity points in the vessel 12 that do not move during rotation of the vessel 12. When the scoop 34 returns to its vertical stowed position, scoop holder 44 may have a rear hook portion 46 that clicks on to an inner rim 48 provided in vessel housing 15 (FIG. 6A). When scoop holder 44 clicks onto rim 48 it may release the detent so that scoop 34 pivots again with respect to arm 36. The sudden pivoting motion may serve to fling off any exudates or granules that may still cling to scoop 34 (as described hereinbelow).

Scoop 34 may be vibrated or shaken (or otherwise agitated, all the terms being used interchangeably throughout) at some point in its path (e.g., over vessel 12) to help loosen and throw off exudates, litter (particularly wet litter) or other particles that may cling to scoop 34, as is described below with reference to FIG. 5B. Scoop 34 may have any kind of suitable construction for separating exudates from litter 14, such as but not limited to, mesh or net construction, with spacings, apertures or other kinds of openings for litter 14 to pass therethrough.

The scoop may vibrate during separation (scooping the exudates into the scoop), washing and/or drying. The vibration may help granules to pass through the apertures of the scoop, while the exudates are trapped in the scoop during separation. The vibration during washing and during drying may improve passage of the granules through the apertures and thereby enhance a trommel effect during washing and enhance a mixing effect that accelerates drying, as described hereinbelow.

A Non-Limiting Construction of the Washer

Figure 2:
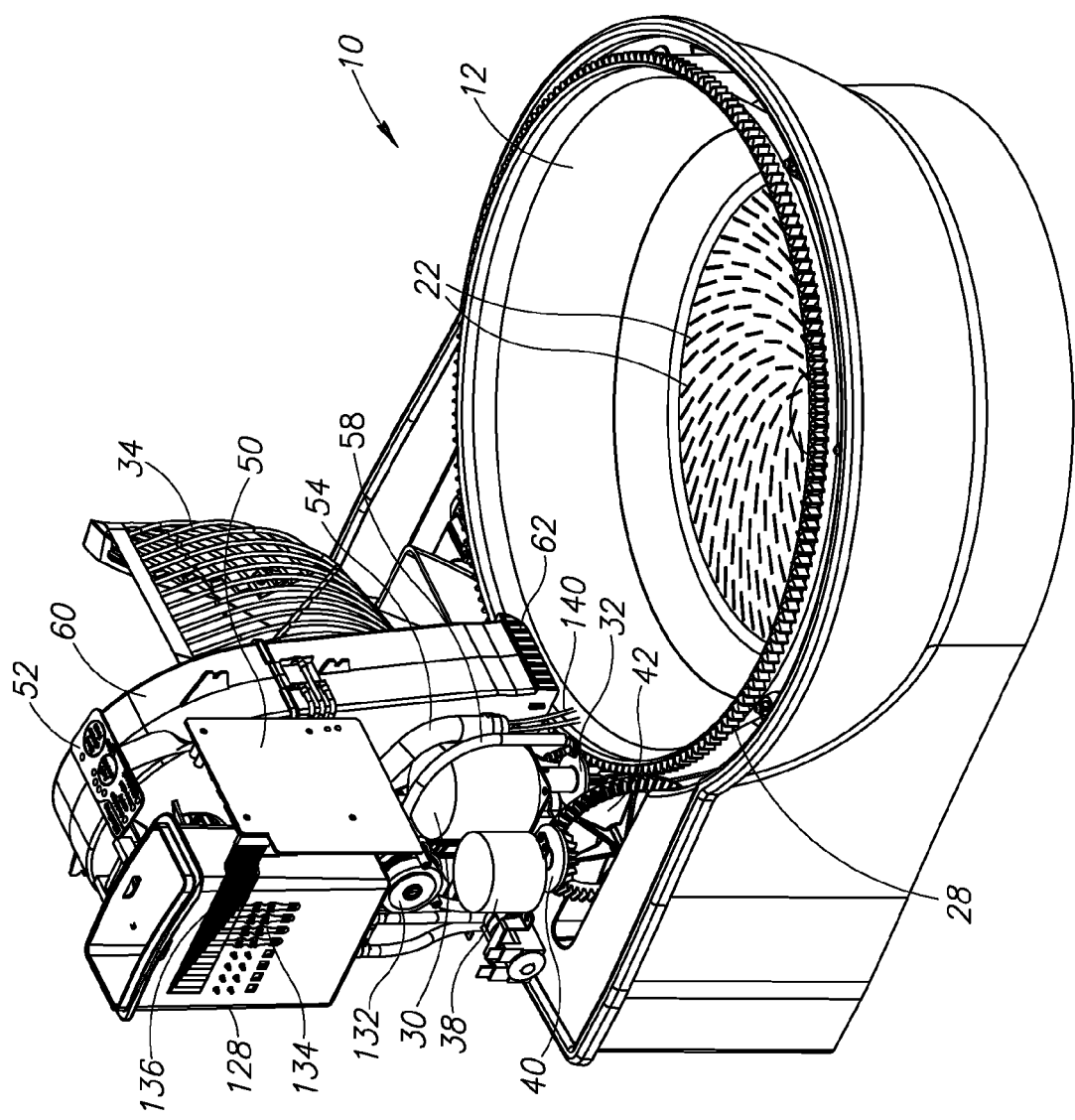
FIG. 2 is a simplified pictorial illustration of the feline exudate apparatus of FIG. 1, with outer parts removed to show inner parts, such as a rotating bowl, scoop mechanism, control unit, drying/blowing unit and motors/actuators, in accordance with an embodiment of the present invention.
Figure 3:
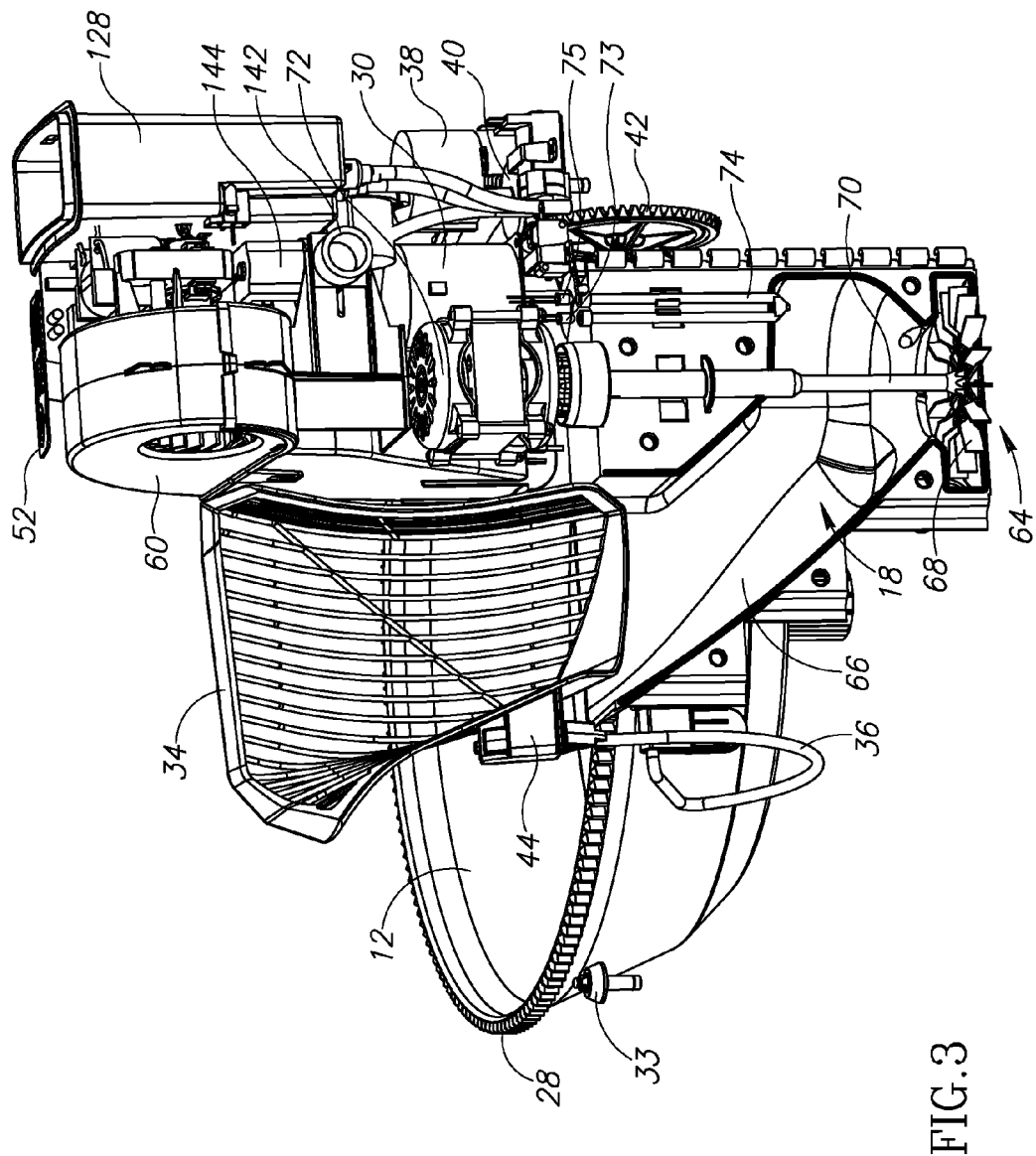
FIGS. 3 and 4 are simplified rear view and cutaway-side-view illustrations, respectively, of the feline exudate apparatus of FIG. 1, with outer parts removed to show inner parts, such as an exudate processor with grinding and flushing sub-units, in accordance with an embodiment of the present invention.

Reference is now made to FIGS. 2-4. A washer pipe or tubing 54 may be provided for washing the litter 14, vessel 12, housing 15 or flushing unit 18 and the like, and for soaking the exudates. Washer pipe 54 may introduce a washing liquid 140 (FIG. 2), such as water from a liquid supply (as for a washing machine) via a connector 142 (FIG. 3) into vessel 12. An electronic valve 144 (FIG. 3) may control the flow of washing liquid 140 from the liquid supply through washer pipe 54. Dispenser 56 may automatically (e.g., preprogrammed or programmable) or semi-automatically or otherwise dispense detergent or disinfection solution, odor neutralizer, deodorant or other suitable chemicals or any combination thereof, through tube 58 into the washing liquid 140 in vessel 12, or onto litter 14, housing 15 or flushing unit 18 and the like, for disinfecting litter 14, vessel 12, housing 15 and/or flushing unit 18. The detergent or disinfection solution may be dispensed as a continuous flow, jet flow or intermittent flow, for example.

A Non-Limiting Construction of the Dryer

A dryer 60 may be provided in processing unit 20 for blowing hot air over the litter 14 to dry the litter 14 and vessel 12. Dryer 60 may include a blower (e.g., a centrifugal fan or blower) and heating element (e.g., electrical resistance heater) for heating air that exits outlets 62 into vessel 12.

A Non-Limiting Construction of the Pump/Crusher Sub-Unit

Reference is now made to FIGS. 3, 4, 4A and 4B, which illustrate the construction and action of flushing device 18 and exudate processor 64 (also referred to as a pump/crusher sub-unit) in accordance with an embodiment of the invention.

As seen in FIGS. 4A and 4B, flushing device 18 and exudate processor 64 may be constructed as a separately installable unit, which may open and close about a hinge 150. This greatly facilitates cleaning and maintenance of the unit. Flushing device 18 may include a chute 66, into which scoop 34 can deposit exudates and into which washing liquid can be introduced through one or more openings 152. Flushing device 18 may further include a pump assembly for drawing or sucking the exudates out of the feline exudate apparatus 10. The pump assembly may include a centrifugal pump that comprises blades 68 mounted on a shaft 70 powered by a motor 72 coupled to shaft 70 by a coupling 71. Rotation of the blades 68 by motor 72 sucks exudates down chute 66, past the blades 68 and out through an outlet seal 77 (FIG. 4A), which may be connected by any suitable sealed connection to a sewage or waste pipe (e.g., via a nipple 76 in housing 15, shown in FIG. 4). A one-way valve 78 may be provided to ensure that there is no backflow.

Accordingly, after separator 16 has separated the exudates from the litter 14, scoop 34 may expel the exudates via chute 66 to exudate processor 64. In general, exudate processor 64 may be a mechanical reduction processor, such as but not limited to, a grinder, chopper, mincer, pulverizer, crusher, crumbler, or an abrasive device that mechanically reduces the size of the exudates. In the non-limiting illustrated embodiment, exudate processor 64 may be the blades 68 of the flushing unit. Blades 68 may be designed to be sharp to chop up the exudates to small or minute particles. (Alternatively, there may be chopping blades on shaft 70 above blades 68.) Exudate processor 64 may reduce the feline exudates in size prior to flushing to the waste system. Alternatively or additionally, exudate processor 64 may be a chemical reduction processor, such as but not limited to, a dispenser (e.g., dispenser 56 or a separate dispenser) that dispenses a chemical agent (acidic or basic or suitable enzyme, for example) for reducing the size, dissolving, or breaking down the exudates or hair. Thus the exudate processor 64 may operate with a combination of mechanical and chemical breakdown or reduction of the exudates ("exudates" includes hair).

The flushing device 18 may further include a suction pump or other fluid driving means (not shown) to pump or otherwise drive fluid from vessel 12 to the exudate processor 64 and/or to sewage or waste pipe connected to nipple 76 (FIG. 4).

A liquid level device may be provided to monitor the level of liquid in the vicinity of exudate processor 64, chute 66 and vessel 12. In the non-limiting illustrated embodiment, the liquid level device may include a light source 73 (e.g., LED) that emits a light beam through a light guide 74 with a lower reflecting surface that reflects the light beam back up towards an optical sensor 75. The light that impinges upon optical sensor 75 is different depending on whether the lower reflecting surface is immersed in liquid or not, thus providing an indication of the liquid level. For example, if reflection occurs it is a sign that there is no water present. In contrast, if there is water at the lower end, the light is hardly reflected and a different signal is generated. A controller may easily discern between the different signals to "know" if there is water present or not. It is noted that light source 73 and optical sensor 75 may be part of the processing unit 20, thus enabling remote liquid level sensing within the lower parts of the apparatus.

A Non-Limiting Construction of the Controller

Reference is made to FIG. 2. Processing unit 20 may include a controller 50 (e.g., microprocessor mounted on a printed circuit board) which may control operation of actuator 38 and movement of scoop 34. Controller 50 may be preprogrammed or user-programmable (e.g., with an input device such as a keyboard, for example). A control panel 52, with control buttons, display indicators and the like, may be provided to operate feline exudate apparatus 10.

A Non-Limiting Construction of the Dispenser

Controller 50 may also control operation of dispenser 56. The construction of dispenser 56 is shown in FIGS. 7A-7E, to which reference is additionally made. Dispenser 56 may include two housing halves 110 and 112, in which a flexible container 114 (e.g., plastic or aluminum foil bag) is disposed. Flexible container 114 may store therein detergent or disinfection solution, odor neutralizer, deodorant or other suitable chemicals or any combination thereof. Flexible container 114 may be provided with an outlet port 116 and nipple seal 118 that sits in outlet port 116. Each housing half 110 and 112 may include a holding member 120 that presses against sides of flexible container 114.

Referring to FIGS. 7C-7E, it is seen that housing half 110 may include a printed circuit board (PCB) 124 mounted on a wall thereof. An outer side of PCB 124 may be provided with contacts 126 that are in electrical contact with an integrated circuit (IC) 127 mounted on the inner side of PCB 124. IC 127 may include a memory chip, such as but not limited to, an EEPROM (electrically erasable read-only memory), flash memory and the like. IC 127 may store information, such as but not limited to, the chemical composition of the contents of flexible container 114, the initial volume of the contents of flexible container 114, user identity information, expiry date information and many other kinds of data. Upon insertion of dispenser 56 into the apparatus, controller 50 can interrogate IC 127 to verify if the dispenser is authorized for usage and permit operation only if authorization is validated. Control 50 can monitor the contents of flexible container 114 via IC 127. For example, PCB 124 may include sensors (e.g., liquid level sensor) and other electronics for monitoring the contents of flexible container 114. With information obtained from IC 127, the controller 50 can "know" how many times the dispenser 56 has dispensed a dosage of liquid, what quantity has been dispensed, and how many dosages are left.

Figure 7F:
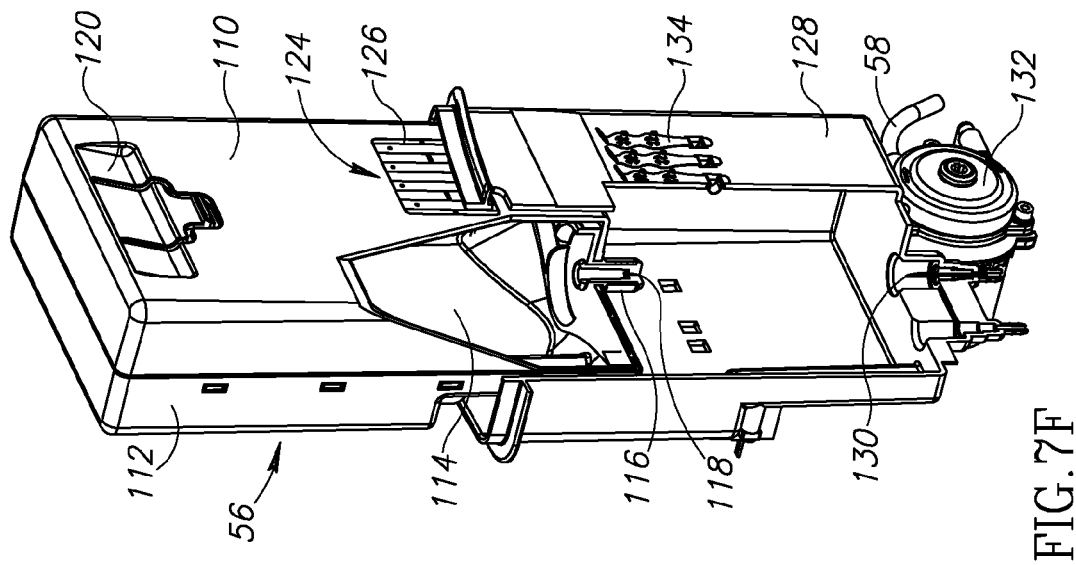
Figure 7G:
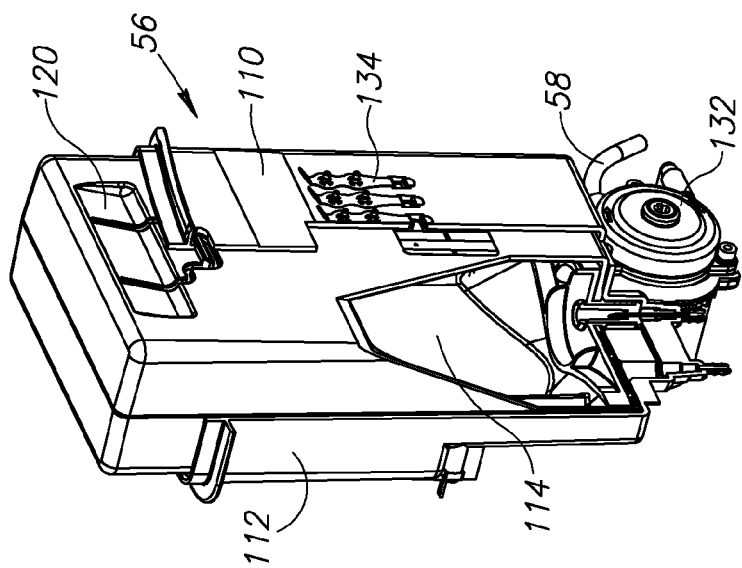

Referring to FIGS. 7F-7G, it is seen that dispenser 56 may be inverted and inserted in a dispenser housing 128. Dispenser housing 128 may include a needle 130 in fluid communication with a dispenser pump 132. When dispenser 56 is pushed down into dispenser housing 128, needle 130 punctures nipple seal 118 to effect fluid communication between the contents of flexible container 114 and pump 132. (When dispenser 56 is pushed down into dispenser housing 128, holding member 120 may snap onto a rim of dispenser housing 128.) Pump 132 may then meter out the contents of flexible container 114 through a tube 58 to vessel 12, litter 14, housing 15 or flushing unit 18 and the like. Dispenser housing 128 may include contacts 134 which may electrically contact the contacts 126 of PCB 124, and which may be electrically connected by a flexible cable 136 (FIG. 2) to controller 50. In this manner, controller 50 is brought into communication with PCB 124 and pump 132 to control operation of dispenser 56.

A Non-Limiting Method of Using the Feline Exudate Apparatus

Reference is now made to FIGS. 5A-5G, and additionally to FIGS. 6A-6E, which illustrate a method of operating feline exudate apparatus 10 in accordance with an embodiment of the present invention. Other examples of methods will be described later with reference to FIGS. 8B-8C.

The cleaning cycle of feline exudate apparatus 10 may be started with scoop 34 in the stowed position shown in FIG. 1. The cycle may be activated by the cat owner pushing a manual start button after the cat has excreted into the litter 14 in vessel 12. Alternatively, the cycle may be activated automatically or semi-automatically with different sensors. For example, a cat sensor (e.g., a volumetric or capacitance sensor or optical sensor, not shown) may sense the presence or entrance of the cat into vessel 12, further sense the cat leaving the vessel 12 and initiate operation of the apparatus according to some timing program or other method. As another example, a wetness sensor, e.g., a sensor that measures electrical current and can differentiate between dry and wet litter (not shown), may be used to commence operation of the apparatus.

As mentioned above, in the stowed position, the rear hook portion 46 of scoop holder 44 may initially latch on to inner rim 48 of vessel 12 (FIG. 6A). Actuator 38, via arm 36, may release scoop holder 44 from rim 48 and scoop 34 may pivot downwards by its own weight (FIG. 6B). Scoop 34 may be lowered after the vessel 12 has started to rotate, or alternatively, scoop 34 may be lowered into vessel 12 and then afterwards vessel 12 may start to rotate. Actuator 38, via arm 36, may continue to lower scoop 34 until it reaches a point at or near the bottom of vessel 12 (FIGS. 6C-6D). At this point, as seen in FIG. 6D, scoop 34 is distanced from rotation axis 24. In FIG. 6E, actuator 38 has moved scoop 34, via arm 36, in a horizontal manner (described above) closer to rotation axis 24. In this manner, scoop 34 is not lowered directly onto any exudates that may be in the vicinity of the center of vessel 12, thereby preventing mashing the exudates and helping scoop up the exudates.

Moreover, the angular movement of scoop 34 may be synchronized with the angular position of vessel 12, so that scoop 34 will not come down on top of the exudates (if left from a previous separation cycle) and mash them but instead will scoop them up. The synchronization may be easily achieved since the rotational speed of vessel 12 is known (15 sec for one rotation, for example) and the controller 50 can thus coordinate the movement of scoop 34 with the rotation of vessel 12. Scoop 34 may be lowered so as not to mash the exudates left in vessel 12.

Figure 5A:
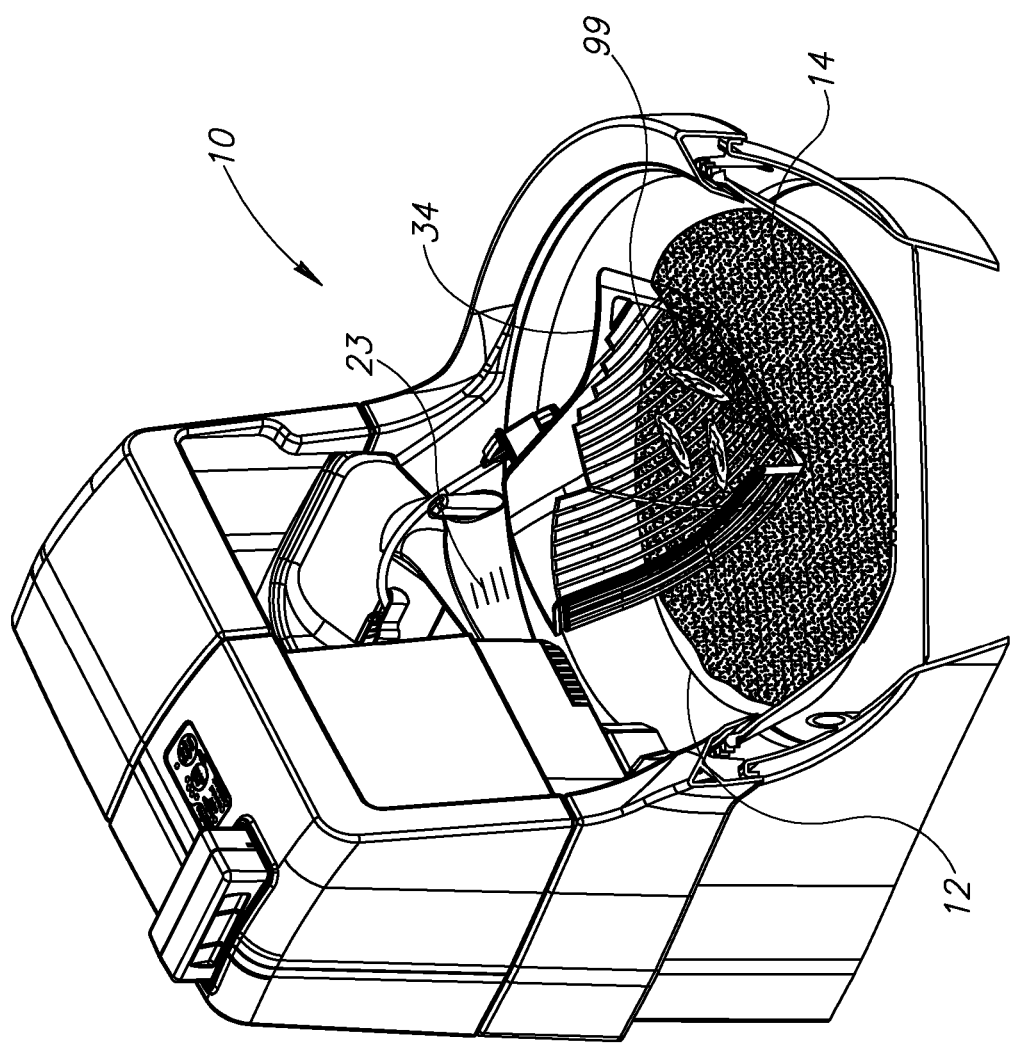

The position of FIG. 6E is the position shown in FIG. 5A, to which reference is now made.

At the position shown in FIGS. 5A and 6E, as vessel 12 rotates, scoop 34 may rake and scoop out exudates 99 from the litter 14. In one method of use, no liquid is yet introduced into vessel 12. The vessel 12 may be rotated by motor 30 while scoop 34 remains somewhat stationary in the litter 14. Alternatively, scoop 34 may be vibrated or moved as well vertically or horizontally or otherwise. The vessel 12 may be rotated clockwise or counterclockwise or a combination of both, wherein the controller 50 periodically changes the direction of rotation of vessel 12.

Figure 5B:
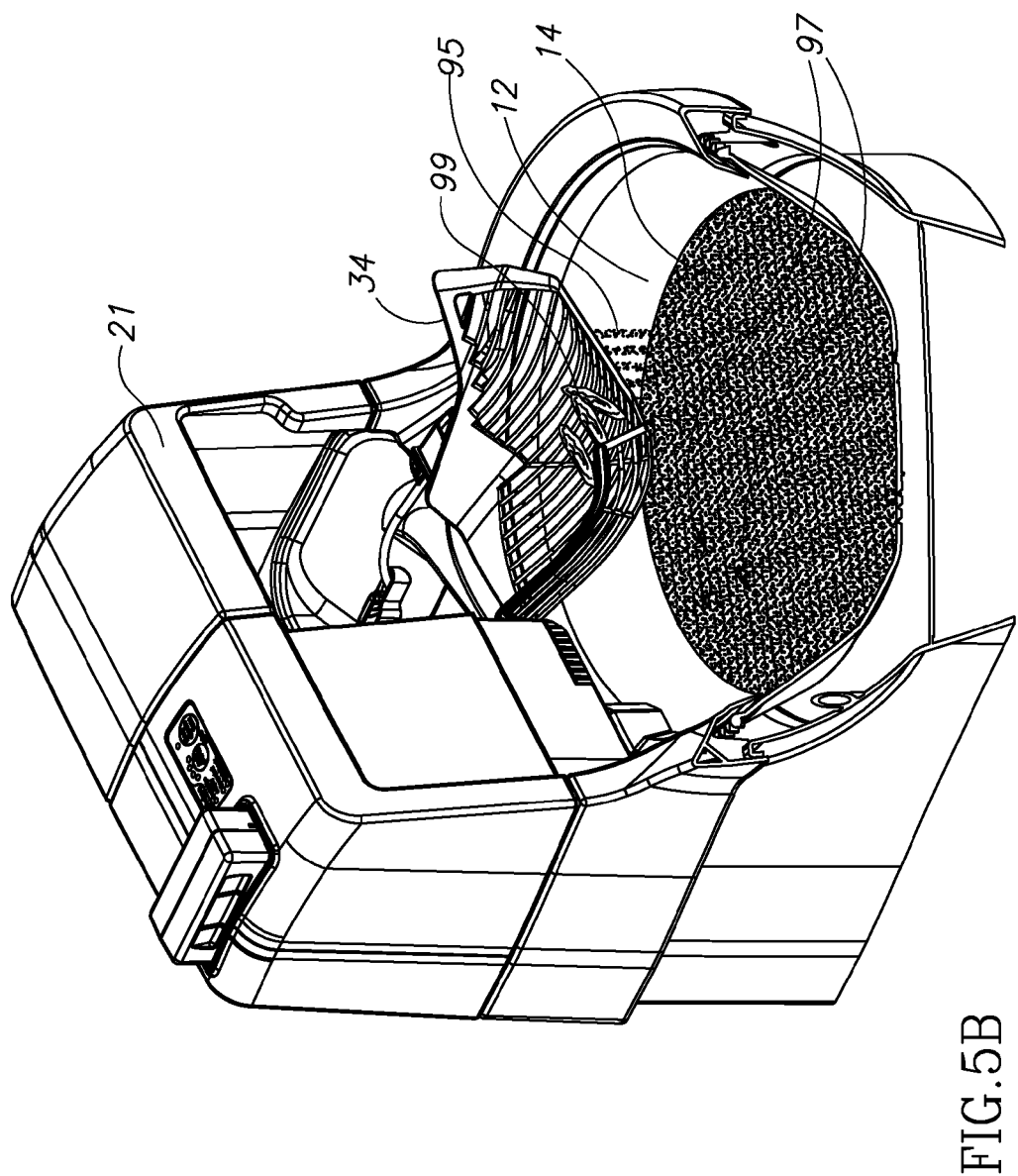

Reference is now made to FIG. 5B. After one or more rotations of vessel 12 (the amount may be pre-determined by the controller 50 or may be selected by the user), and after scoop 34 has separated exudates from litter 14, scoop 34 moves upwards out of vessel 12. The movement of scoop 34 into and out of vessel 12 may be relatively smooth. Alternatively scoop 34 may be vibrated or shaken (or otherwise agitated, all the terms being used interchangeably throughout) at some point in its path (e.g., over vessel 12) to help loosen and throw off exudates, litter (particular wet litter) or other particles that may cling to scoop 34. For example, actuator 38 or arm 36 may incorporate a vibrating mechanism (e.g., an off-center weight mounted on actuator 38 or arm 36 that rotates with arm 36 but oscillates to cause vibration) to vibrate scoop 34.

Another alternative for shaking off particles from scoop 34 is shown in FIGS. 5A and 6E. Cover 17 may include a non-smooth portion 23, such as but not limited to, sawtooth, sinusoidal, wavy, roughened edge or surface and the like, over which the back portion of scoop 34 swipes when moving up towards its stowed position. Scoop 34 shakes as it goes over the non-smooth portion 23, thereby shaking off litter granules 95 therefrom (FIG. 5B).

Referring again to FIG. 5B, scoop 34 has captured exudates 99 therein. Residuals or small particles 97 (shown in FIGS. 5B and 5D) of exudates may remain in litter 14 in vessel 12. Actuator 38 may then continue to move scoop 34 back underneath scoop cover 21, this position being shown in FIG. 5C to which reference is now made.

Figure 5C:
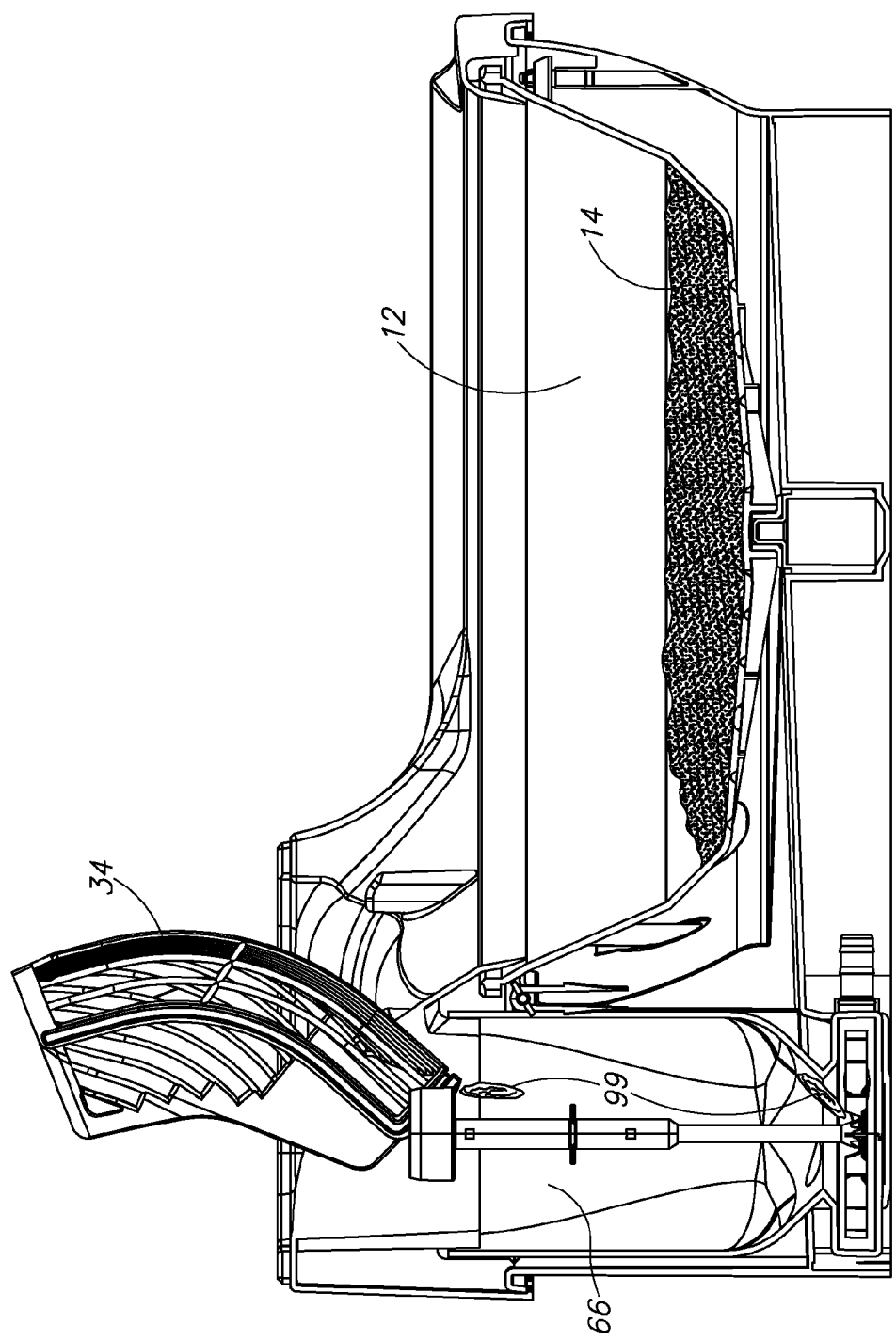

In the stowed position of FIG. 5C, scoop 34 dumps exudates and/or clumps into chute 66. When scoop 34 reaches the stowed position, as mentioned above, scoop holder 44 clicks onto rim 48 with a sudden pivoting motion that may serve to fling off any exudates or granules that may still cling to scoop 34. Any matter found in chute 66 will eventually be ground by exudate processor 64 and flushed away by flushing device 18, as will be explained below.

Figure 5D:
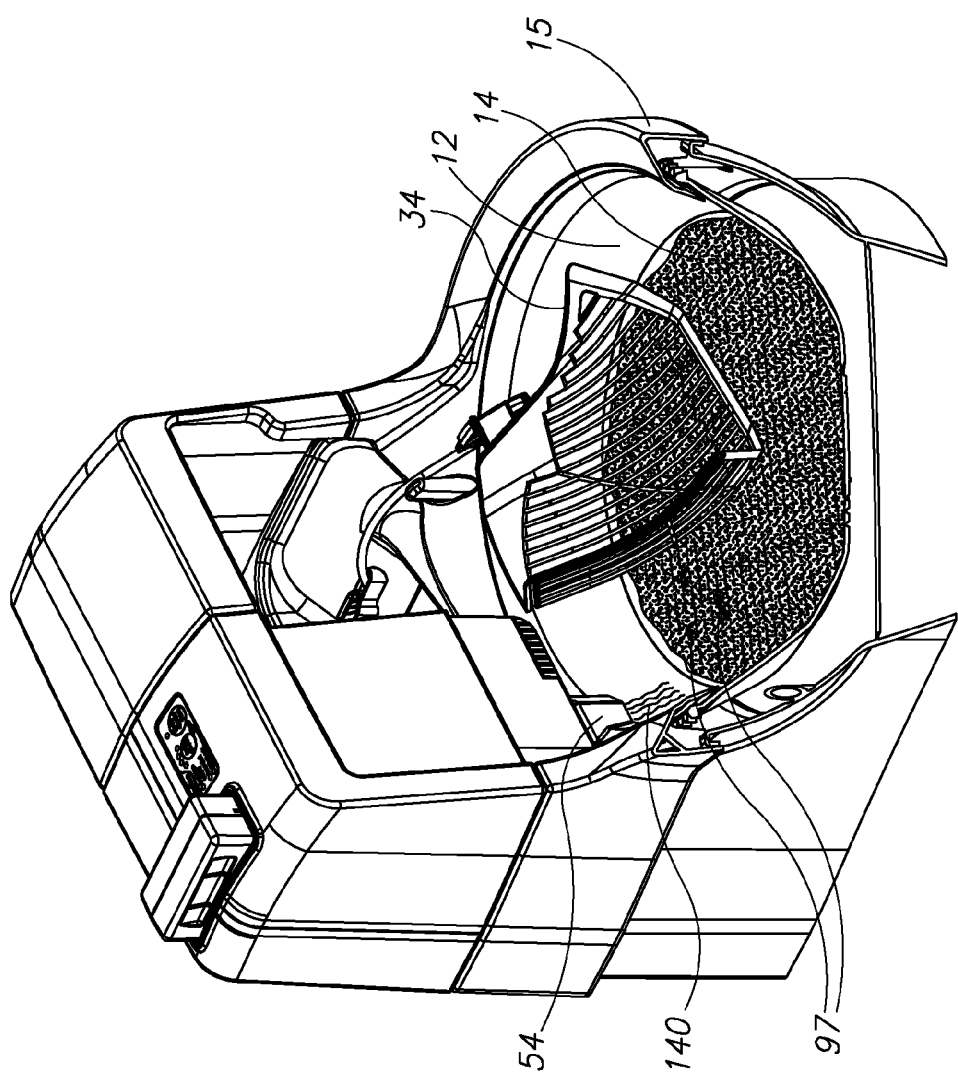
Figure 5E:
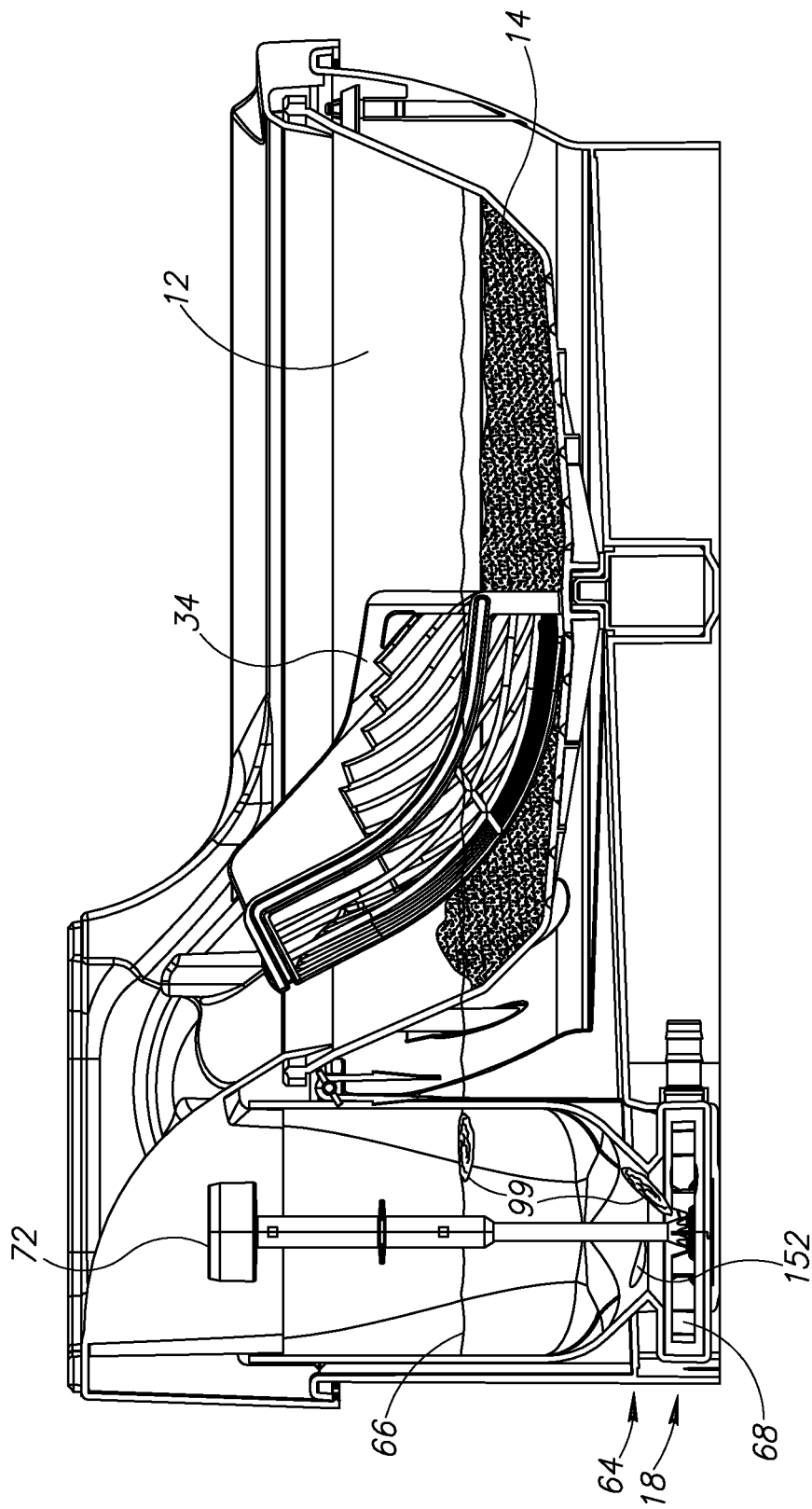

Reference is made additionally to FIG. 5D (perspective view) and FIG. 5E (side view). In one non-limiting method of using the apparatus, washing liquid 140 is introduced into vessel 12. As mentioned above, washing liquid 140 may be introduced via washer pipe 54 (FIG. 2) for washing the litter 14, vessel 12, housing 15 and/or flushing unit 18 and the like, and for soaking the exudates. Washer pipe 54 may introduce washing liquid 140 directly into vessel 12 and the liquid 140 may flow via slots 22 to a sump 67 below vessel 12 (FIG. 4), and from there through openings 152 into chute 66. The level of the washing liquid may be sensed and controlled by the liquid level device described above. In this manner, the liquid 140 soaks the litter 14 and any residual exudates in vessel 12 and also soaks the exudates 99 in chute 66. Alternatively, washing liquid 140 may be introduced directly into chute 66 by another pipe (not shown), as mentioned later with reference to FIG. 8C.

Before, during or after introduction of washing liquid 140 into vessel 12, scoop 34 may be lowered back into vessel 12, as shown in FIGS. 5D and 5E. During the time the litter 14 and any residual exudates are soaking in the washing liquid, vessel 12 is rotating with scoop 34 disposed in the liquid slurry. The litter 14 and the residual exudates rub against scoop 34 as they pass through and over scoop 34. This provides a trommel effect, wherein scoop 34 scrubs and grinds the exudates and litter 14. In addition, scoop 34 may rub against the sides and bottom of vessel 12, or may squeeze and rub the granules of litter 14 against the sides and bottom of vessel 12, to clean surfaces of the vessel 12, scoop 34 and/or the granules of litter 14. The trommel and cleansing effects may be enhanced by changing the direction of rotation of vessel 12 (clockwise to counterclockwise and vice versa). Moreover, scoop 34 may be vibrated or moved up and down to different levels in the vessel 12, or may be moved sideways and in other motions to prevent stagnation points of the litter 14. The trommel effect may enhance grinding of the residual exudates into fine particles that may be flushed away with the spent dirty washing liquid. The clockwise and counterclockwise rotation or vessel 12 may be synchronized with lowering and raising of scoop 34, allowing for better cleansing.

It is noted that in the above description, the washing liquid is added, the exudates and litter are soaked and washed in the washing liquid with the trommel effect, and afterwards the waste material is flushed away. Alternatively, the soaking step may be eliminated, and instead the waste material may be continuously washed with the washing liquid and flushed away.

As seen best in FIG. 5E, excess liquid drains through slots 22 to sump 67 and flows from sump 67 through openings 152 to chute 66 of exudate processor 64 and flushing device 18.

Figure 5F:
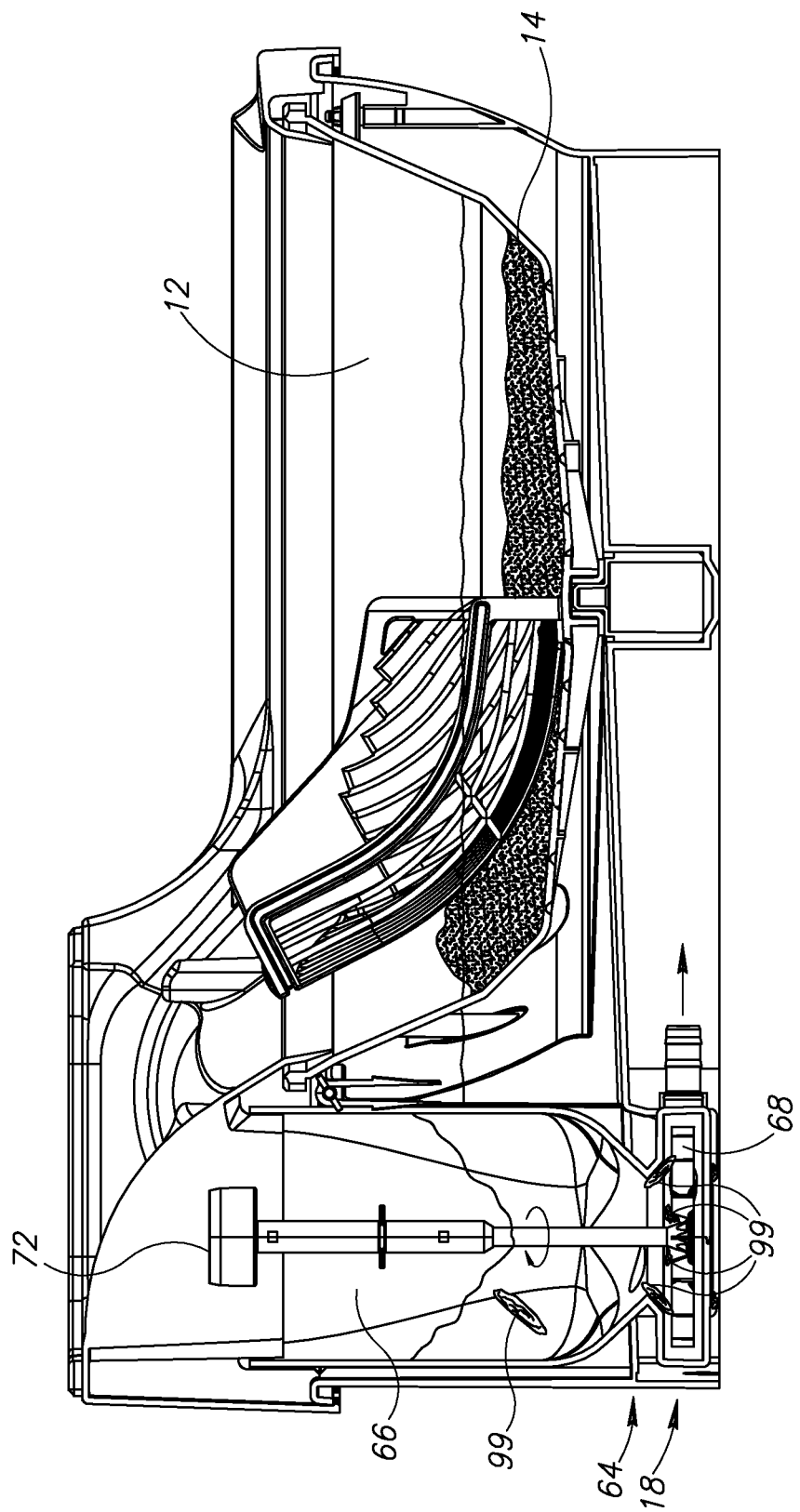

Reference is now made to FIG. 5F. After one or more rotations of vessel 12 (the amount may be pre-determined by the controller 34 or may be selected by the user), the exudate processor 64 may commence grinding exudates 99 found in chute 66. Motor 72 rotates blades 68 via coupling 71. The blades 68 may have a stepped shape (best seen in FIG. 4B), wherein an inner portion of the blades 68 (closest to shaft 70) is lower in height and an outer portion is higher, the lower portion extending up to the higher portion by a sharp step. The inner portion of the blades 68 and the step serve to chop, slice and otherwise reduce the exudates in size. The outer portion of blades 68 of exudate processor 64 acts as a centrifugal pump that sucks the chopped particles and sends them out to the waste pipe via nipple 76. The sucking action of the liquid into the centrifugal pump, draws the exudates towards the blades 68, which chop the exudates and suck the waste outwards (the latter being the flushing action of the flushing unit 18). Thus blades 68 provide the functionality of exudate processor 64 and of flushing unit 18, although other units may provide these functionalities within the scope of the invention.

The washing and flushing actions may be repeated as many times as desired.

Figure 5G:
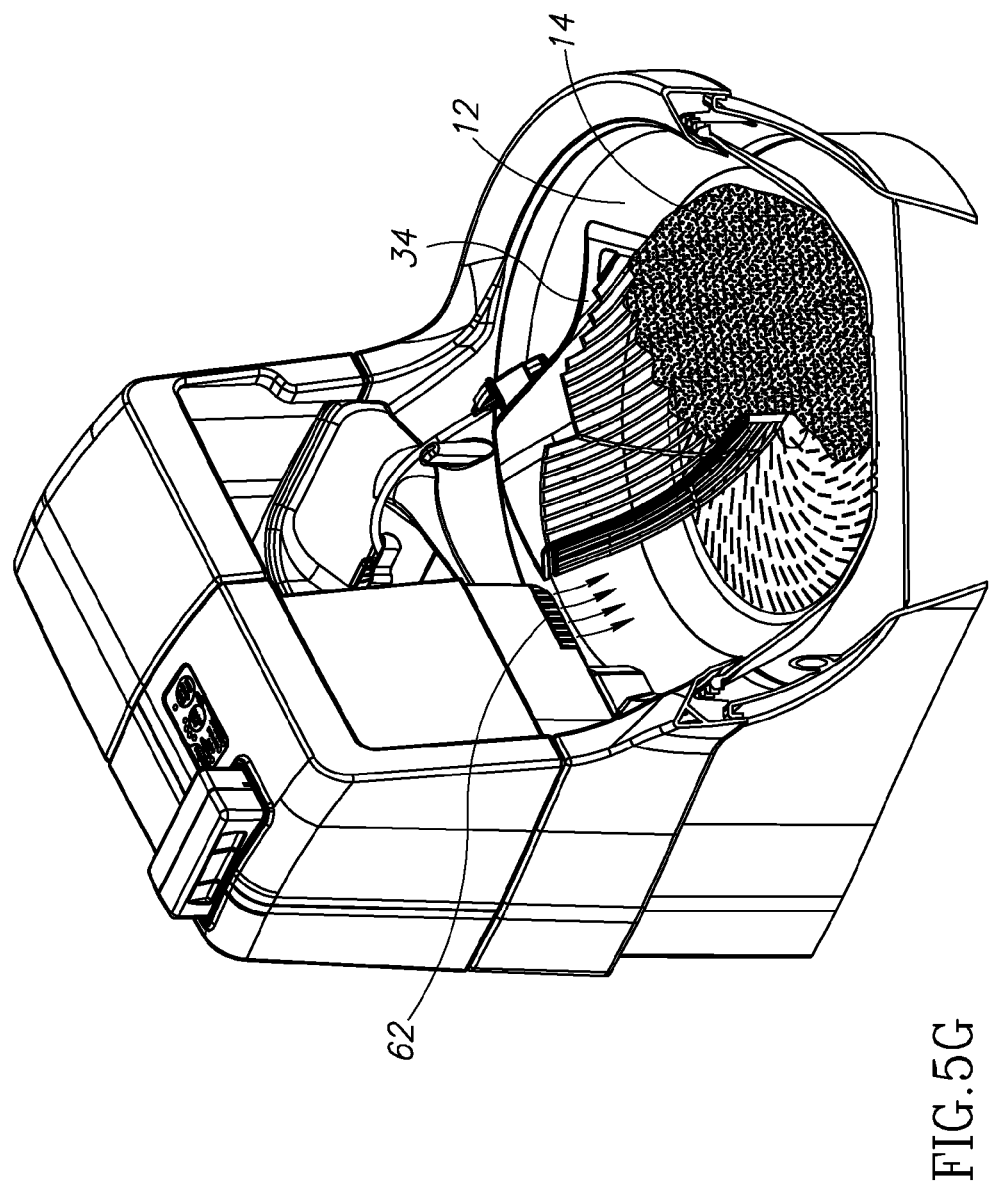

Reference is now made to FIG. 5G. After the collected exudates and residual exudates and particles have been processed by exudate processor 64 and flushed by flushing device 18, vessel 12 and the washed granules of litter 14 that remain therein may be dried by dryer 60 (FIG. 2) (e.g., by a flow of hot air through outlets 62 seen in FIG. 5G). Vessel 12 may rotate during drying, clockwise, counterclockwise or any combination thereof. Litter 14 flows past and through scoop 34 during rotation of vessel 12, which causes the granules of litter 14 to be shaken, turned over and otherwise agitated during drying, which may substantially enhance and accelerate the drying process. This also ventilates the litter 14 and exposes the sides and bottom of vessel 12 for better drying of the litter 14 and the sides and bottom of vessel 12. Changing the direction of rotation or movement of the scoop 34 during the process may also help loosen the litter 14, and expose litter 14 and parts of vessel 12 for better drying.

Dispenser 56 may dispense substances on the granules of litter 14 and/or vessel 12 during the drying and agitating process. (Dispensing the substances may be done before or after the drying and agitating process, too.) This may help neutralize odors during drying, and deodorize or provide a pleasant scent to the drying air, the granules of the litter 14 and other portions of apparatus 10. Dispenser 56 may dispense sanitizing or disinfecting substances on the granules of litter 14 and/or vessel 12 during the drying and agitating process in addition to or instead of the odorant substances. This may leave a coating of sanitizer on the litter 14. Thus, when the cat leaves exudates at subsequent usages of the feline litter apparatus 10, the sanitizer left on the litter 14 may immediately act against germs and other microorganisms found in the cat excreta. There is thus a continuous process of disinfecting and deodorizing by means of the coating of sanitizer and other substances left on litter 14, even after the apparatus 10 has finished a complete operating cycle.

In short, the litter 14 may be dried by a flow of hot air over the litter 14 while agitating the litter 14. (The term "agitating" encompasses any movement of the litter, such as but not limited to, shaking, stirring, overturning, mixing and the like.) The litter 14 may be agitated by the relative movement of scoop 34 with respect to vessel 12. Additionally or alternatively, the litter 14 may be agitated by an enforced hot air flow which picks up and throws about the litter granules or otherwise agitates them with or without the assistance of relative movement with respect to vessel 12 and litter 14. After the vessel 12 and litter 14 are dry, and after scoop 34 has returned to its stowed position, the apparatus is ready for further use.

Figure 8A:
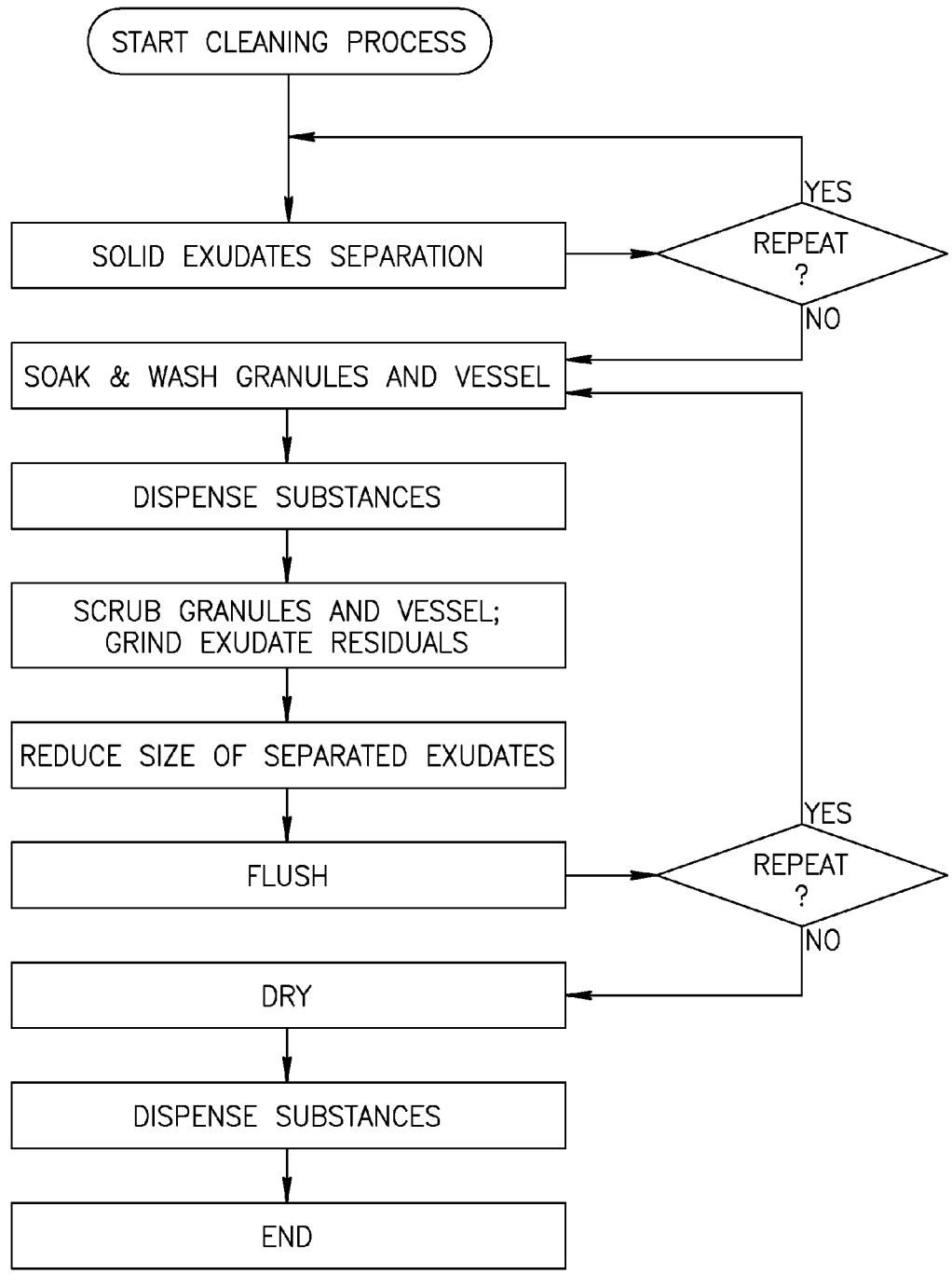
FIGS. 8A, 8B and 8C are simplified flow charts of methods for removing feline exudates, in accordance with embodiments of the present invention.

The above method may be summarized with reference to the flow chart of FIG. 8A. After starting the cleaning process, solid exudates may first be separated from the litter (by scooping out with the scoop 34, as described above.) The process of scoop 34 scooping out exudates and dumping them in chute 66 may be repeated as many times as desired. Then the litter granules and the vessel may be washed and scrubbed (such as in the presence of substances dispensed by dispenser 56), with exudate residuals and particles being ground in the trommel effect described hereinabove (with or without soaking). The exudates separated by scoop 34 and segregated to chute 66 may be ground and all the waste material may be flushed away, as described above. Washing, scrubbing/trommelling, grinding and flushing may be done simultaneously, sequentially or any combination thereof. After washing, cleaning and disinfecting the litter 14 and vessel 12, the litter 14 and vessel 12 may be dried for further use. Dispenser 56 may dispense sanitizing or disinfecting substances on the granules of litter 14 and/or vessel 12 before, during or after drying as mentioned above.

Other Non-Limiting Methods of Using the Apparatus

Figure 8B:
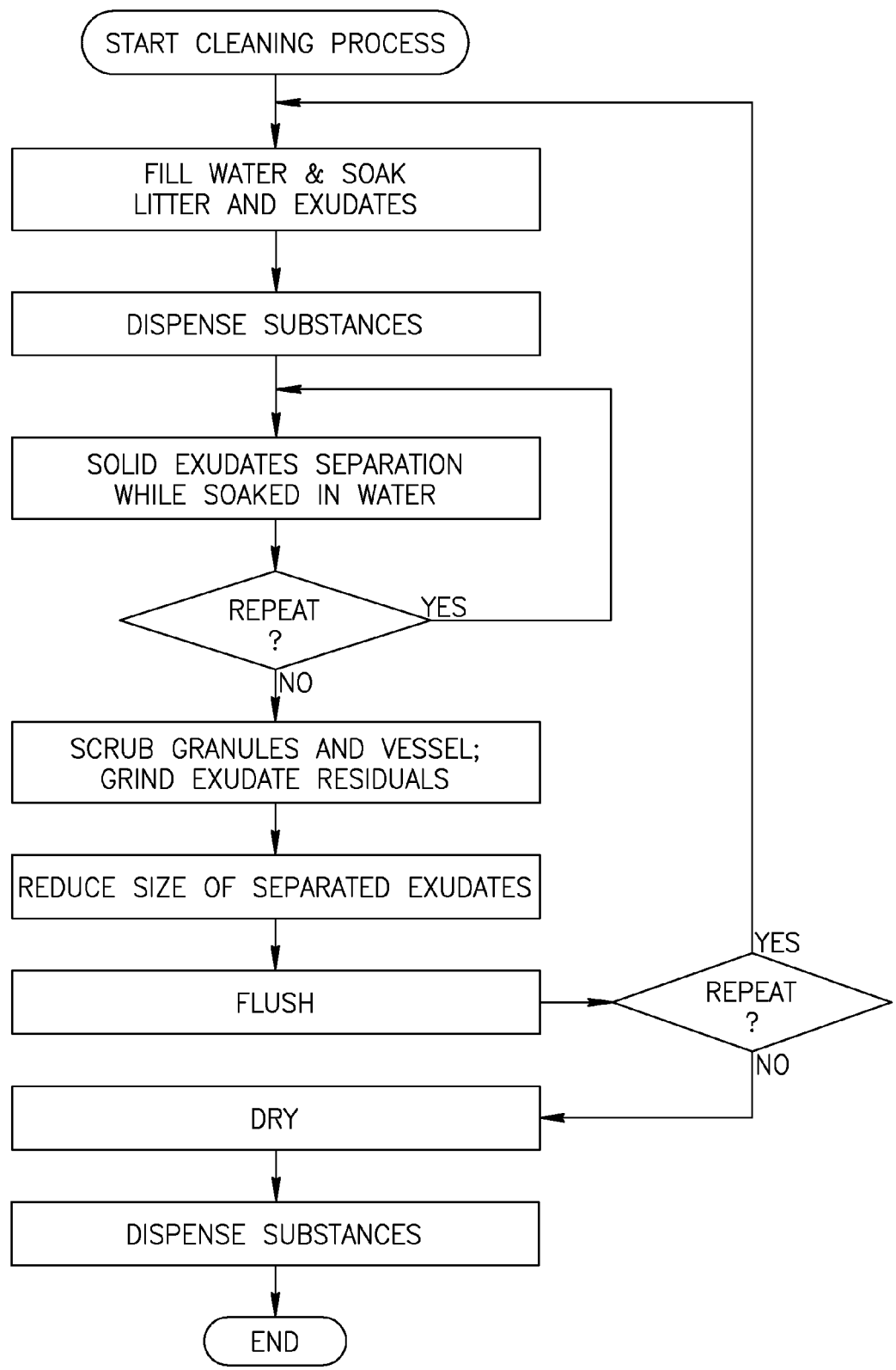
Figure 8C:
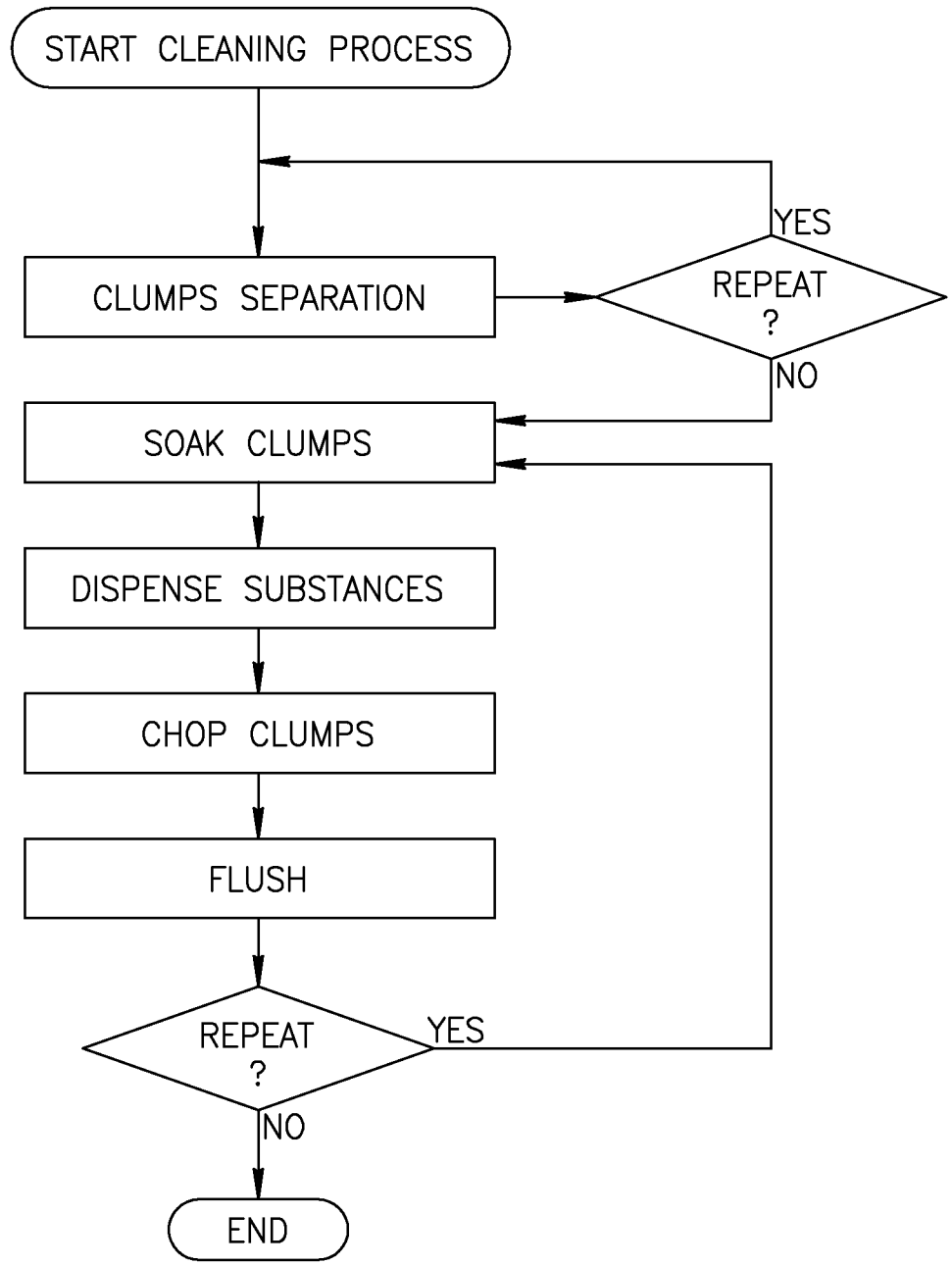

Reference is now made to FIGS. 8B and 8C, which illustrate other methods in accordance with embodiments of the invention. It is noted that the methods outlined in FIGS. 8A-8C are just three basic examples of methods, and it is appreciated that the invention is not limited to these examples. For example, many different combinations of washing, size reduction of exudate/solids/clump, and flushing are possible in the invention.

In the method described at length above, after starting the cleaning cycle, solid exudates are scooped out from the litter 14 by scoop 34 and only afterwards is liquid introduced into the vessel 12. In contrast, in the method of FIG. 8B, the litter 14 and exudates in vessel 12 are first soaked in the washing liquid. Dispenser 56 may dispense sanitizing or disinfecting substances into the vessel 12. Solid exudates may float in the liquid, others may be partially submerged and others may be fully submerged at the bottom on the litter 14. Scoop 34 is dipped into the liquid and fishes the solid exudates out of the liquid. Scoop 34 may be vibrated while in the liquid. The soaking done before dipping scoop 34 into the liquid may help separate the exudates before scoop 34 catches them. The soaking and dispensed substances may also help dissolve or reduce the size of some of the exudate particles. Afterwards, the process may continue as described for the previous embodiment, namely, the litter granules and the vessel may be washed and scrubbed, with exudate residuals being ground in the trommel effect (with or without soaking) described hereinabove. The exudates separated and segregated to chute 66 may be ground and all the waste material may be flushed away. After washing, cleaning and disinfecting, the litter 14 and vessel 12 may be dried for further use. Dispenser 56 may dispense sanitizing or disinfecting substances on the granules of litter 14 and/or vessel 12 before, during or after drying as mentioned above.

FIG. 8C shows a variation of the process, particular useful when clumping litter is used. In this variation, washer pipe 54 may be eliminated and washing liquid 140 may be introduced directly into chute 66 by another pipe (not shown) or by re-routing washer pipe 54 to lead directly into chute 66. The slots 22 at the bottom of vessel 12 and openings 152 may be eliminated or closed up; there is no fluid path via sump 67 below vessel 12 to chute 66. In other words, all liquid activity takes place in chute 66 while the vessel 12 and litter 14 remain dry. Scoop 34 may be used to scoop out clumps and other solid exudates from litter 14, as described above, and dump them in chute 66. The clumps may soak in the liquid found in chute 66, which may include substances dispensed from dispenser 56. Afterwards, the clumps may be chopped or otherwise reduced in size by exudate processor 64, and the waste products may be flushed by flushing device 18, as described hereinabove. It is noted that soaking, chopping and flushing may be done sequentially or in a continuous combined process or any combination thereof. Dispenser 56 may dispense sanitizing or disinfecting substances on the granules of litter 14 at any time.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method comprising: providing a vessel for containing litter therein for a pet to excrete thereupon; washing and soaking feline exudates in a flushing device or feline exudates deposited in reusable litter in said vessel; wherein said vessel is movably mounted in a housing and said vessel supports said litter therein during movement with respect to said housing; separating said feline exudates from said litter with a mechanical separator, wherein said litter passes through said separator; flushing away said feline exudates with said flushing device, wherein said mechanical separator deposit exudates in said flushing device; and drying said litter.

2. The method according to claim 1, wherein said litter is disposed in a vessel, and wherein said vessel is moved while separating said feline exudates from said litter.

3. The method according to claim 1, wherein said litter is disposed in a vessel, and wherein said vessel is moved during drying of the litter.

4. The method according to claim 1, wherein said litter is disposed in a vessel, and wherein at least one of an underside and sides of said vessel is exposed during drying of the litter.

5. The method according to claim 1, wherein removing the feline exudates from the litter comprises introducing a scoop into said litter that scoops out the feline exudates from the litter.

6. The method according to claim 5, wherein said litter is disposed in a vessel, and wherein said vessel is moved during drying of the litter, and wherein said scoop overturns said litter as said vessel moves.

7. The method according to claim 5, wherein said scoop has apertures for the litter to pass through, and the method further comprises moving the litter through the apertures.

8. The method according to claim 7, wherein said litter and residual exudates rub against said scoop as they pass through and over said scoop, wherein said scoop scrubs and grinds said litter and residual exudates.

9. The method according to claim 5, wherein at least one of an underside and sides of said vessel is scraped by said scoop during drying of the litter.

10. The method according to claim 5, further comprising moving said scoop to different positions in the vessel while said vessel is moving.

11. The method according to claim 5, further comprising agitating said scoop when at least one of said litter and exudates are present in said scoop.

\* \* \* \* \*